United States Patent
Shin

(10) Patent No.: US 8,660,199 B2
(45) Date of Patent: Feb. 25, 2014

(54) METHOD OF DEMODULATING A QUADRATURE AMPLITUDE MODULATION SIGNAL AND METHOD OF DATA COMMUNICATION

(75) Inventor: Myeong-Cheol Shin, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/434,040

(22) Filed: Mar. 29, 2012

(65) Prior Publication Data

US 2012/0250805 A1 Oct. 4, 2012

(30) Foreign Application Priority Data

Mar. 29, 2011 (KR) .................. 10-2011-0028183

(51) Int. Cl.
*H04L 5/12* (2006.01)

(52) U.S. Cl.
USPC ........... 375/261; 375/341; 375/260; 375/262; 375/265; 370/207

(58) Field of Classification Search
None
See application file for complete search history.

(56) References Cited

U.S. PATENT DOCUMENTS

| | | |
|---|---|---|
| 7,751,472 B2 | 7/2010 | Watanabe |
| 2007/0058745 A1* | 3/2007 | Watanabe .................. 375/264 |
| 2009/0274235 A1 | 11/2009 | Lee et al. |
| 2011/0158350 A1 | 6/2011 | Murakami et al. |
| 2012/0140612 A1* | 6/2012 | Petrov et al. ............... 370/207 |

FOREIGN PATENT DOCUMENTS

| | | |
|---|---|---|
| JP | 2007-74618 A | 3/2007 |
| JP | 2010-74856 A | 4/2010 |
| KR | 10-2008-0085971 A | 9/2008 |

* cited by examiner

*Primary Examiner* — Adolf Dsouza
(74) *Attorney, Agent, or Firm* — Sughrue Mion, PLLC

(57) ABSTRACT

To demodulate a quadrature amplitude modulation (QAM) signal, a reception point is determined corresponding to a symbol in the QAM signal that is received where the symbol is mapped to one reference point of a plurality of reference points in a rotated constellation and the plurality of reference points are represented by an in-phase (I) coordinate and a quadrature-phase (Q) coordinate. A plurality of candidate points corresponding to a portion of the plurality of reference points are selected based on distances between the reception point and the respective reference points. The reception point is demapped by calculating a plurality of log-likelihood ratios based on the plurality of candidate points, the plurality of log-likelihood ratios corresponding to bits of data represented by the reception point.

19 Claims, 18 Drawing Sheets

METHOD OF DEMODULATING A QUADRATURE AMPLITUDE MODULATION SIGNAL AND METHOD OF DATA COMMUNICATION

CROSS-REFERENCE TO RELATED APPLICATION

This application claims priority under 35 U.S.C. §119 to Korean Patent Application No. 10-2011-0028183, filed on Mar. 29, 2011, in the Korean Intellectual Property Office (KIPO), the contents of which are incorporated herein in its entirety by reference.

BACKGROUND

1. Technical Field

Example embodiments relate generally to data processing, and more particularly to methods of demodulating a quadrature amplitude modulation (QAM) signal that is modulated using a rotated constellation and associated methods of data communication.

2. Description of the Related Art

Frequency resources for data communication are limited, but the amount of data communications is increasing at a rapid rate. Efficient modulation and demodulation are required to communicate the large amount of data under limited frequency resources. For example, a QAM scheme may be adopted in communication devices and systems such that a plurality of data bits may be transferred as one symbol in the QAM signal. The plurality of data bits may be transferred as one symbol in the QAM signal by modulating a phase and an amplitude of the QAM signal in a transmitter. By adopting this modulation scheme, the signal received by a receiver may be severely distorted through a fading channel, and the calculation amount for demodulating the received signal may be significantly increased when the modulation order (e.g., 64-QAM, 256-QAM) increases.

SUMMARY

Some example embodiments provide a method of demodulating a QAM signal with efficient demapping.

Some example embodiments provide a method of data communication with efficient mapping and demapping.

According to an aspect of exemplary embodiments, there is provided a method of demodulating a quadrature amplitude modulation (QAM) signal including determining a reception point corresponding to a symbol in the QAM signal that is received, where the symbol is mapped to one reference point of a plurality of reference points in a rotated constellation, the plurality of reference points being represented by an in-phase (I) coordinate and a quadrature-phase (Q) coordinate. A plurality of candidate points corresponding to a portion of the plurality of reference points are selected based on distances between the reception point and the respective reference points. The reception point is demapped by calculating a plurality of log-likelihood ratios based on the plurality of candidate points, the plurality of log-likelihood ratios corresponding to bits of data represented by the reception point.

Selecting the candidate points may include determining a channel response of a communication channel through which the QAM signal is received, and selecting the candidate points based on the channel response, a plurality of one-dimensional distances, and a plurality of two-dimensional distances between the reception point and the respective reference points.

Determining the reception point may include determining an I-coordinate of the reception point based on an I-component of the symbol, and determining a Q-coordinate of the reception point based on a Q-component of the symbol.

Selecting the plurality of candidate points may include selecting a plurality of one-dimensional candidate points based on the plurality of one-dimensional distances, the plurality of one-dimensional distances being calculated based on a significant coordinate among the I-coordinate and the Q-coordinate, the significant coordinate being associated with a higher channel response among an I-channel response and a Q-channel response, and selecting a plurality of two-dimensional candidate points based on the plurality of two-dimensional distances, the plurality of two-dimensional distances being calculated based on both of the I-coordinate and the Q-coordinate.

Selecting the plurality of candidate points may include selecting a plurality of one-dimensional candidate points based on the plurality of one-dimensional distances, the plurality of one-dimensional distances being calculated based on a significant coordinate among the I-coordinate and the Q-coordinate, the significant coordinate being associated with a channel response that is higher than a threshold response, and selecting a plurality of two-dimensional candidate points based on the plurality of two-dimensional distances, the plurality of two-dimensional distances being calculated based on both the I-coordinate and the Q-coordinate.

Selecting the plurality of candidate points may include selecting a plurality of one-dimensional candidate points based on the plurality of one-dimensional distances when a ratio of an I-channel response and a Q-channel response is lower than a first threshold ratio or higher than a second threshold ratio, the plurality of one-dimensional distances being calculated based on a significant coordinate among the I-coordinate and the Q-coordinate, the significant coordinate being associated with a higher channel response among an I-channel response and a Q-channel response, and selecting a plurality of two-dimensional candidate points based on the plurality of two-dimensional distances, the plurality of two-dimensional distances being calculated based on both of the I-coordinate and the Q-coordinate.

At least one-dimensional distance may be calculated by comparing an I-coordinate of the reception point and at least one reference point or comparing a Q-coordinate of the reception point and at least one reference point, based on the channel response.

At least one two-dimensional distance may be calculated by reversely rotating the reception point and the plurality of reference points by a rotation angle of the rotated constellation and by comparing an I-coordinates of the reversely-rotated reception point and at least one reversely-rotated reference point and comparing a Q-coordinates of the reversely-rotated reception point and at least one reversely-rotated reference point.

The plurality of candidate points may include at least two reference points with respect to the bits of the data represented by the reception point.

Selecting the candidate points may include selecting a first candidate point among the plurality of reference points having a first bit value with respect to each bit of data, and selecting a second candidate point among the plurality of reference points having a second bit value with respect to the bits of data.

An I-component and a Q-component of the symbol may be received through different channels.

The QAM signal that is received may be an orthogonal frequency division multiplexing (OFDM) signal that is received through a wireless communication channel from a transmitter.

A data bit stream may be further generated by performing a decoding operation based on the plurality of log-likelihood ratios. A low density parity check (LDPC) code may be used to generate the data bit steam.

According to an aspect of a further exemplary embodiment, there is provided a method of data communication including generating a quadrature amplitude modulation (QAM) signal using a rotated constellation and transmitting the QAM signal through a communication channel. The QAM signal is received and demodulated by determining a reception point corresponding to each symbol in the received QAM signal, each symbol being mapped to one reference point of a plurality of reference points in a rotated constellation, the plurality of reference points being represented by an in-phase (I) coordinate and a quadrature-phase (Q) coordinate, selecting a plurality of candidate points among the plurality of reference points based on distances between the reception point and the respective reference points, and by demapping the reception point by calculating the plurality of log-likelihood ratios based on the plurality of candidate points, the plurality of log-likelihood ratios corresponding to bits of data represented by the reception point.

According to an aspect of a further exemplary embodiment, there is provided a demodulator including a converting unit that receives a quadrature amplitude modulation (QAM) signal and determines a reception point corresponding to a symbol in the received QAM signal, the symbol being mapped in a transmitter to one reference point of a plurality of references points in a rotated constellation, the plurality of reference points being represented by an in-phase (I) coordinate and a quadrature-phase (Q) coordinate and a demapping unit that selects a plurality of candidate points corresponding to a portion of the reference points based on distances between the reception point and the respective reference points and performs demapping on the reception point by calculating a plurality of log-likelihood ratios based on the plurality of candidate points, the plurality of log-likelihood ratios corresponding to bits of data represented by the reception point.

The demodulator may further include a decoding unit that generates a data bit stream by performing a decoding operation based on the log-likelihood ratios.

The demapping unit may include a channel estimation block which determines a channel response of a communication through which the QAM signal is received, a candidate selecting block which selects the plurality of candidate points based on the channel response, a plurality of one-dimensional distances, and a plurality of two-dimensional distances between the reception point and the respective reference points, and a log-likelihood ratio calculating block which demaps the reception point by calculating the plurality of log-likelihood ratios based on the plurality of candidate points.

The candidate selecting block may include a channel response comparison block which compares an I-channel response and a Q-channel response and output a comparison signal, a one-dimensional candidate selecting block which selects a plurality of one-dimensional candidate points based on the comparison signal and the plurality of one-dimensional distances between the reception point and the respective reference points, and a two-dimensional selecting block which selects a plurality of two-dimensional candidate points based on the comparison signal and the plurality of two-dimensional distances between the reception point and the respective reference points.

At least one two-dimensional distance may be calculated by reversely rotating the reception point and the plurality of reference points by a rotation angle of the rotated constellation and by comparing an I-coordinate of the reversely-rotated reception point and at least one reversely-rotated reference point and comparing a Q-coordinate of the reversely-rotated reception point and at least one reversely-rotated reference point.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
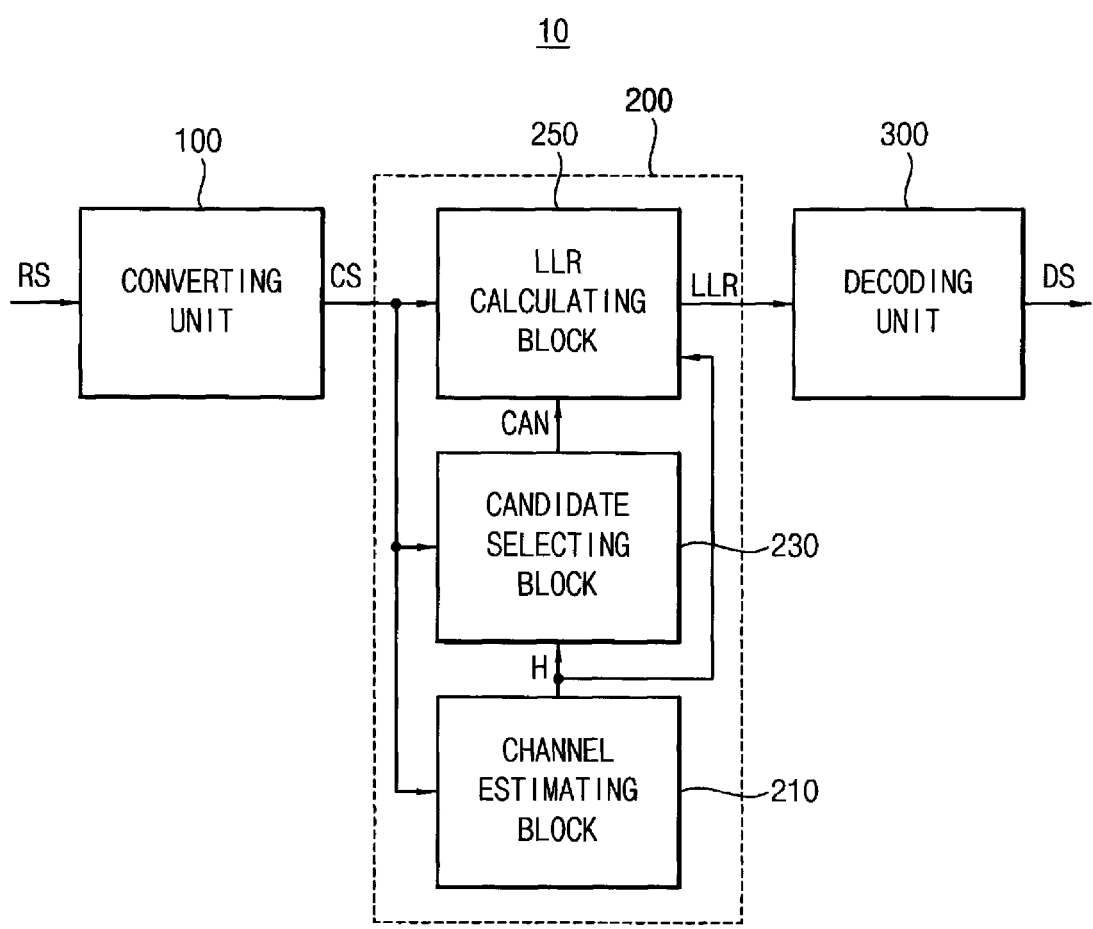
FIG. 1 is a block diagram illustrating a demodulator according to example embodiments.

Various example embodiments will be described more fully hereinafter with reference to the accompanying drawings, in which some example embodiments are shown. Example embodiments may, however, be embodied in many different forms and should not be construed as limited to the example embodiments set forth herein. Rather, these example embodiments are provided so that this disclosure will be thorough and complete, and will fully convey the scope of example embodiments to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a demodulator according to example embodiments.

Referring to FIG. 1, a demodulator 10 includes a converting unit 100, a demapping unit 200, and a decoding unit 300.

Figure 9:
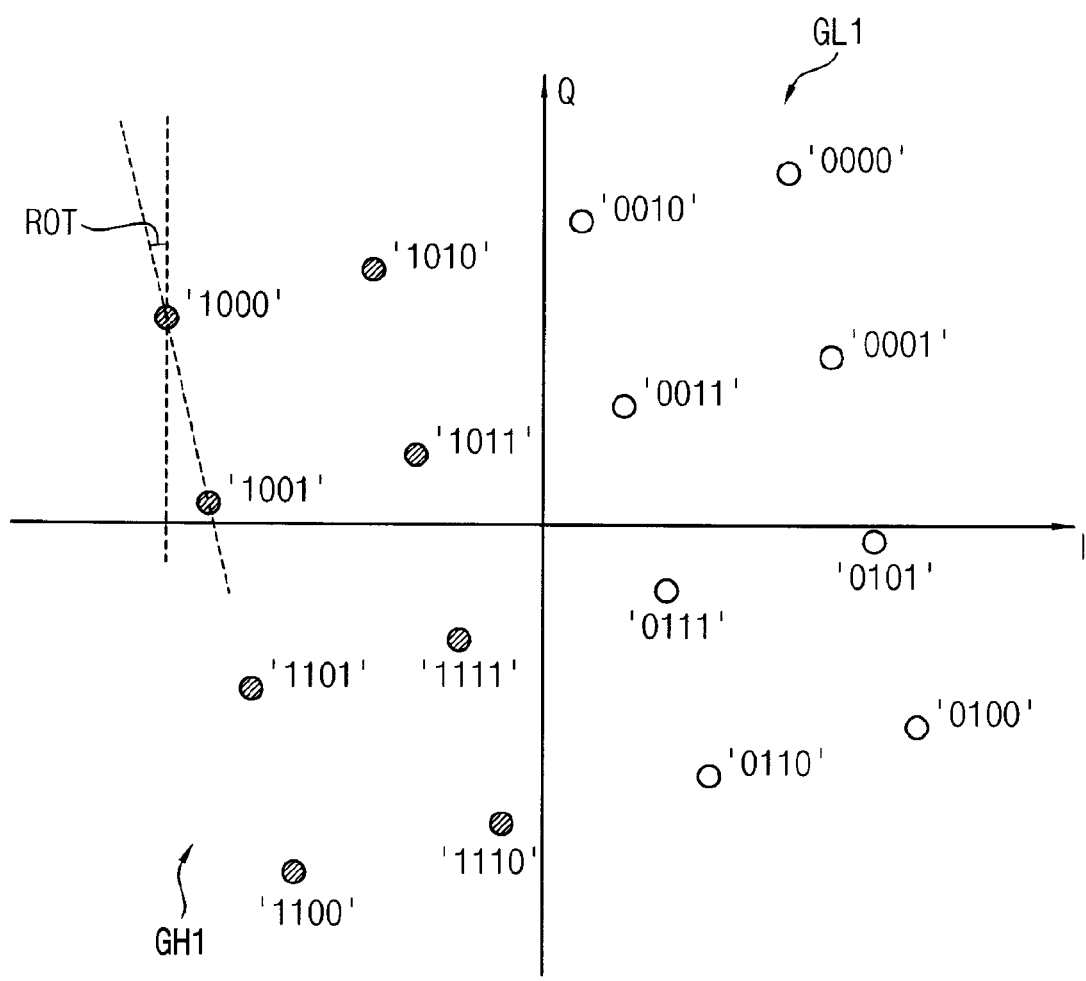
FIG. 9 is a diagram illustrating a plurality of reference points in a rotated constellation.

The converting unit 100 receives a modulation signal RS and determines a reception point CS corresponding to a symbol in the received modulation signal RS. The received modulation signal RS may include a sequence of symbols and the converting unit 100 may sequentially determine a plurality of reception points CS corresponding to the sequence of symbols in the received modulation signal RS. As illustrated in FIG. 9, the received modulation signal may be a signal modulated by a quadrature amplitude modulation (QAM) scheme using a rotated constellation. The symbol is mapped in a transmitter, to one of reference points in the rotated constellation but the reception point CS may not coincide with the mapped reference point since the received QAM signal RS may be distorted due to attenuation and noises through a fading channel.

The received QAM signal RS may be an orthogonal frequency division multiplexing (OFDM) signal, which is further modulated in a carrier domain by the OFDM scheme, and may be received through a wireless communication channel from the transmitter.

The reception point CS and each of the reference points may be represented by an in-phase (I) coordinate along an I-axis and a quadrature-phase (Q) coordinate along a Q-axis. The I coordinate and the Q coordinate are associated with an I-component and a Q-component of the symbol transferred through an I-channel and a Q-channel, respectively. In other words, each of the reception point CS and the reference points may be a point in a coordinate plane formed by the I-axis and the Q-axis. The I-coordinates and the Q-coordinates of the reference points may be predetermined according to the QAM scheme. The I-coordinates and the Q-coordinates of the reception point may be determined by converting unit 100. To reduce the probability of data loss due to a deep fading channel, the I-component and the Q-component of the QAM symbol may be received through different channels. In other words, the I-component and the Q-component of the QAM symbol may be transmitted using carrier waves having different frequency bandwidths.

The reception point CS may be demapped back to one of the reference points represented in the rotated constellation. As mentioned above, the reception point CS may not exactly coincide with the reference point due to the distortion through the fading channel, but may be decoded by the decoding unit 300 to be matched to one of the reference points.

The received QAM signal may be transmitted by the transmitter using various schemes, i.e., chirp spread spectrum (CSS), direct sequence spread spectrum (DSSS), frequency hopping spread spectrum (FHSS), orthogonal frequency division multiplexing (OFDM), single-carrier frequency division multiplexing (SC-FDM), multi-carrier spread spectrum (MC-SS), etc. The received QAM signal may be transferred through a wireless communication channel or a wire communication channel.

The demapping unit 200 selects candidate points CAN corresponding to a portion of the reference points based on distances between the reception point CS and the respective reference points, and performs demapping on the reception point by calculating log-likelihood ratios (LLRs) based on the candidate points CAN. Each LLR may be calculated with respect to each bit of data represented by the reception point CS. In the related art, when the constellation is rotated and LLR is calculated, all of the reference points are used. Thus, the calculation amount is significantly increased as the modulation order (e.g., 64-QAM, 256-QAM) is increased. In contrast, according to example embodiments, the candidate points corresponding to a portion of the reference points are used to calculate the LLR. Thus, the calculation amount may be reduced.

The demapping unit 200 may perform demapping on the reception point CS based on the rotated constellation corresponding to the modulation of the transmitter. For example, if predetermined between the transmitter and the receiver, the demapping unit 200 may perform demapping on the reception point CS based on quadrature phase shift keying (QPSK), 256-QAM, 64-QAM, 16-QAM, etc.

The decoding unit 300 generates a data bit stream DS by performing a decoding operation based on the calculated LLRs. As mentioned above, the converting unit 100 may sequentially determine a plurality of reception points CS corresponding to a sequence of symbols included in the received modulation signal RS, the demapping unit 200 may sequentially calculate the LLRs corresponding to the sequence of the reception points CS and the decoding unit 300 may generate the data bit steam DS corresponding to the sequence of the LLRs. The decoding unit 300 may decode the LLRs using a Bose and Ray-Chaudhuri (BRC) code, a Hadmard code, a Hamming code, Luby transform (LT) code, a Goppa code, a Reed-Solomon error correction code, a Reed-Muller code, a punctured convolution code, a convolution code, a low density parity check (LDPC) code, a turbo code, etc. The decoding unit 300 may use a linear error correction code or a non-linear error correction code.

As illustrated in FIG. 1, the demapping unit 200 may include a channel estimating block 210, a candidate selecting block 230 and an LLR calculating block 250.

The channel estimation block 210 may determine a channel response H of a communication channel through which the QAM signal is received. The communication channel may include an I-channel transferring an I-component of the symbol and a Q-channel transferring a Q-channel transferring a Q-component of the symbol. The channel response H may include an I-channel response HI and a Q-channel response HQ. The phase and the amplitude of the received QAM signal RS may be varied depending on the channel status and performance of the transmitter and the receiver. This variation may be represented by the determined channel response H.

The channel estimation block 210 may estimate the channel response H based on training symbols transmitted prior to data symbols. The channel estimation block 210 may perform a channel estimation using a pilot symbol or a blind channel estimation without the pilot symbol. For example, the channel estimation block 210 may use a linear minimum mean square error (LMMSE) estimation, pilot symbol assisted channel estimation (PSA-CE), an extended symbol assisted estimation (ESAE), a turbo ESAE, a pilot symbol aided modulation (PSAM), etc. The channel estimation block 210 may provide the determined channel response H to the candidate selecting block 230 and the LLR calculating block 250.

The candidate selecting block 230 may select candidate points CAN corresponding to a portion of the reference points based on distances between the reception point CS and the respective reference points. The distances may include one-dimensional distances and two-dimensional distances. The one-dimensional distances indicate a difference between the I-coordinates of two points or a difference between the Q-coordinates of two points and the two-dimensional distances indicate an Euclidean distance between the two points. The candidate selecting block 230 may select at least reference points as the candidate points with respect to each bit of the data represented by the reception point CN. The selection of reference points as the candidate points with respect to each bit of the data represented by the reception point CN will be further described with reference to FIGS. 10, 11, 12 and 13.

According to example embodiments, the candidate selecting block 230 may determine whether the one-dimensional distances or the two-dimensional distances are selected as candidate points based on the determined channel response HI and HQ. The candidate points CAN may include one-dimensional candidate points based on the one-dimensional distances and two-dimensional candidate points based on the two-dimensional distances.

The candidate selecting block 230 provides the candidate points CAN to the LLR calculating block 250, and the LLR calculating block 250 demaps the reception point CN by calculating LLRs based on the candidate points, where each LLR corresponds to each bit of the data represented by the reception point CS. In other words, when one symbol in the received QAM signal RS corresponds to n-bit data, the n LLRs may be calculated. The i-th LLR(bi) corresponding to the i-th bit of the data may be calculated using Expression 1.

$$LLR(bi) \approx \frac{1}{2\sigma^2} \left[ \begin{array}{l} \min_{x \in GLi} (|HI|^2(Ics - Ix)^2 + (|HQ|^2(Qcs - Qx)^2) + \\ \min_{x \in GHi} (|HI|^2(Ics - Ix)^2 + (|HQ|^2(Qcs - Qx)^2) \end{array} \right]$$ (Expression 1)

In Expression 1, $\sigma^2$ indicates a variance of a noise power of a communication channel, GLi indicates a group of reference points having the i-th bit of logic low level (i.e., '1'), GHi indicates a group of reference points having the i-th bit of logic high level (i.e., '0'), Ics and Qcs indicate the I-coordinate and the Q-coordinate of the reception point CS, Ix and Qx indicate the I-coordinate and the Q-coordinate of each reference point, HI indicates the I-channel response and the HQ indicates the Q-channel response.

If the symbol or the reception point CS corresponds to 8-bit data, the number of the reference points is 256. In a related art calculation of the LLR with respect to the rotated constellation, all of the reference points are used. Thus, at least 4*8*256=8192 multiplications (if the I-channel response and the Q-channel response are the same) are required to calculate the LLRs of one symbol. In contrast, when the number of the candidate points selected with respect to each bit according to example embodiments is 4, only 4*8*4=128 multiplications are required to calculate the LLRs of one symbol. Thus, the amount of calculations is significantly reduced.

The demodulator 10 may reduce the amount of calculations. Thus, the performance of the demodulator 10 and associated devices may be enhanced by selecting the candidate points corresponding to a relatively small number of the reference points. Furthermore, instead of calculating all of the reference points, the demodulator 10 calculates the LLRs using only the candidate points.

Figure 2:
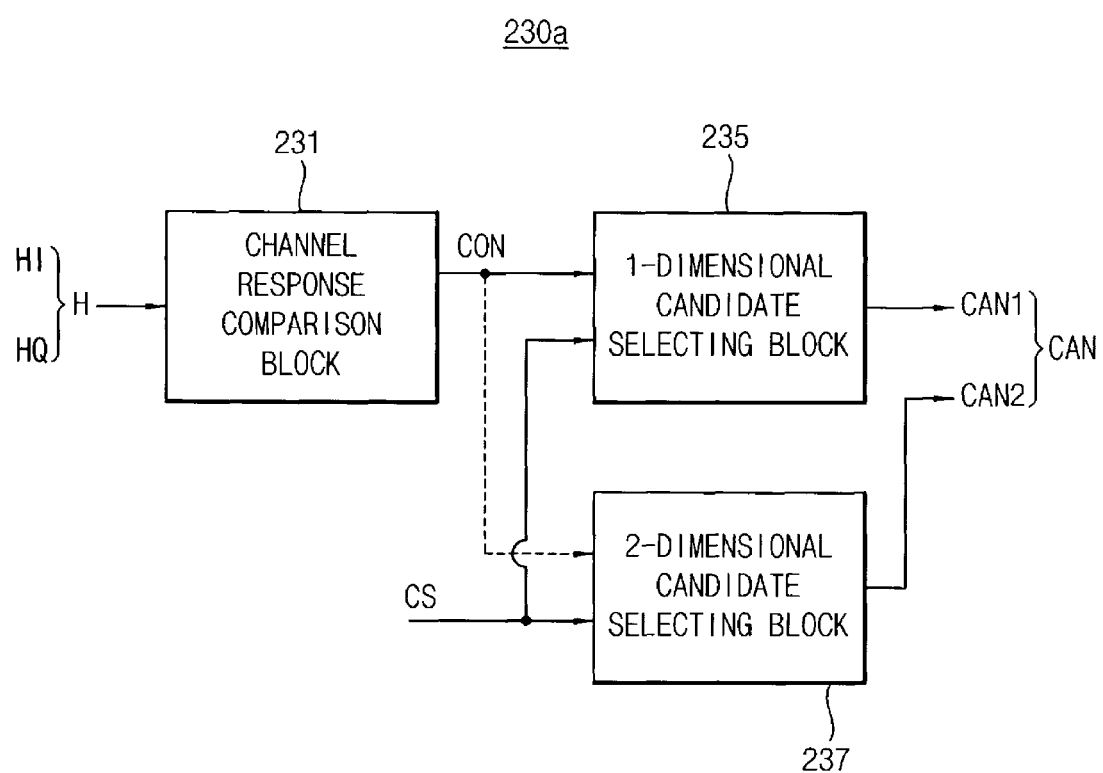
FIG. 2 is a diagram illustrating an example of a candidate selecting block in the demodulator of FIG. 1.

FIG. 2 is a diagram illustrating an example of a candidate selecting block in the demodulator of FIG. 1.

Referring to FIG. 2, a candidate selecting block 230a may include a channel response comparison block 231, a one-dimensional candidate selecting block 235 and a two-dimensional candidate selecting block 237.

The channel response comparison block 231 may compare an I-channel response HI and a Q-channel response HQ and output a comparison signal CON representing the comparison result to the one-dimensional candidate selecting block 235. In some example embodiments, the comparison signal CON may be further provided to the second-dimension candidate selecting block 237. One of the one-dimensional candidate selecting block 235 and the second-dimension candidate selecting block 237 may be enabled in response to the comparison signal CON, or both of the second-dimension candidate selecting block 237 may be enabled in response to the comparison signal CON.

The one-dimensional candidate selecting block 235 may select one-dimensional candidate points CANT among the reference points in the rotated constellation based on the comparison signal CON and the one-dimensional distances between the reception point CS and the respective reference points. The one-dimensional candidate selecting block 235 may determine, based on the comparison signal CON, whether the one-dimensional candidate points CAN1 are selected. The selecting block may also determine whether the one-dimensional distances along the I-axis is selected as the one-dimensional candidate point CAN1 or the one-dimensional distances along the Q-axis is selected as the one-dimensional candidate point CAN1. The one-dimensional distances along the I-axis may be obtained by comparing the I-coordinates of the reception point CS and the respective reference points. The one-dimensional distances along the Q-axis may be obtained by comparing the Q-coordinates of the reception point CS and the respective reference points.

The one-dimensional candidate selecting block may select the one-dimensional candidate point CAN1 efficiently through one-dimensional calculation by comparing the I-coordinates or the Q-coordinates.

The two-dimensional candidate selecting block 237 may select two-dimensional candidate points CAN2 among the reference points in the rotated constellation based on the comparison signal CON and the two-dimensional distances between the reception point CS and the respective reference points. The two-dimensional candidate selecting block 237 may determine, based on the comparison signal CON, whether the two-dimensional candidate points CAN2 are selected. The two-dimensional distances may be calculated based on both the I-coordinates and the Q-coordinates between the reception point CS and the respective reference points.

Figure 14:
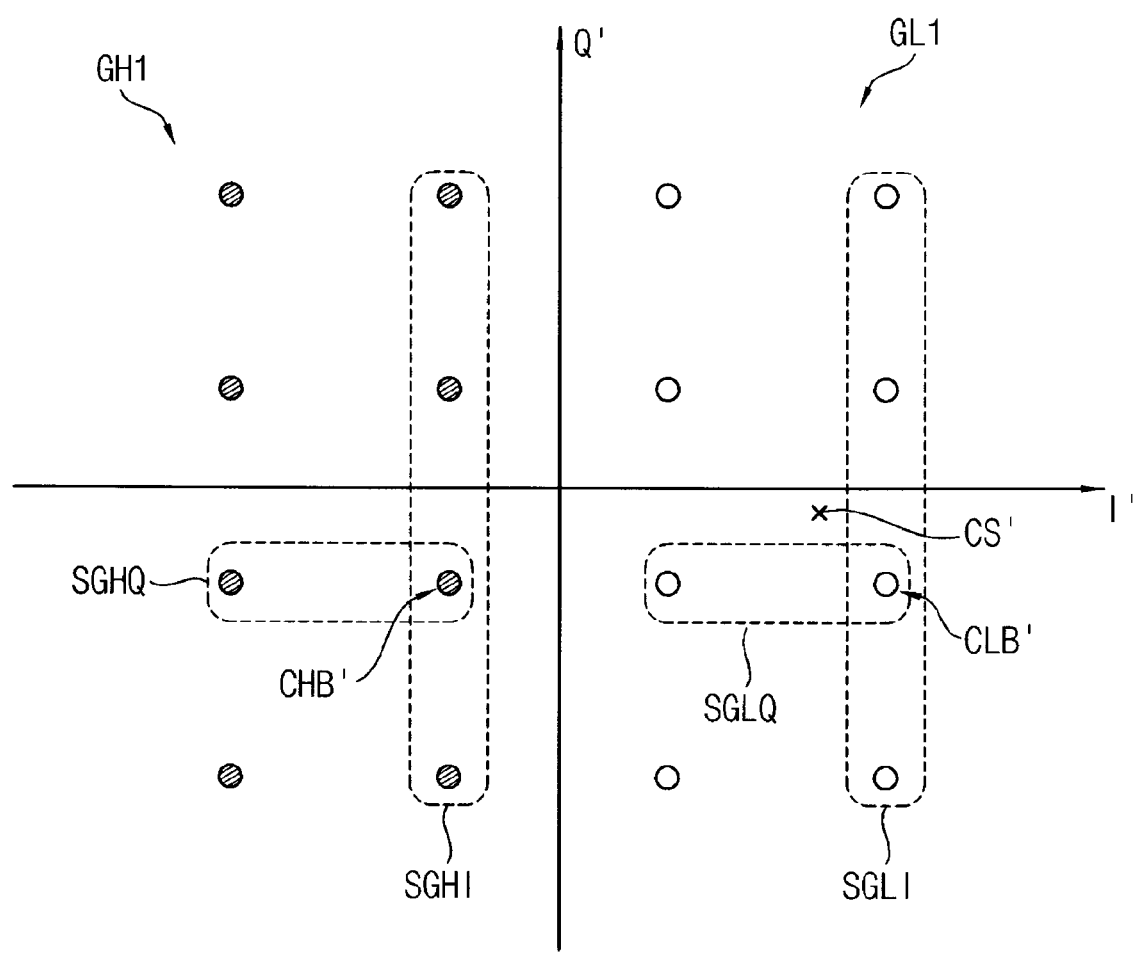
FIG. 14 is a diagram for describing the method of selecting two-dimensional candidate points of FIG. 8.

In some example embodiments, the two-dimensional distance may be calculated through one-dimensional calculation. For example, as illustrated in FIG. 14, the reception point CS and the reference points may be rotated reversely by a rotation angle of the rotated constellation. Since the reference points are rearranged in parallel to the I-axis and the Q-axis, the I-coordinates of the reversely-rotated reception point and each reversely-rotated reference point may be compared. The Q-coordinates of the reversely-rotated reception point and each reversely-rotated reference point may be compared. Thus, the two-dimensional distance is not calculated using the Euclidean distance.

Figure 3:
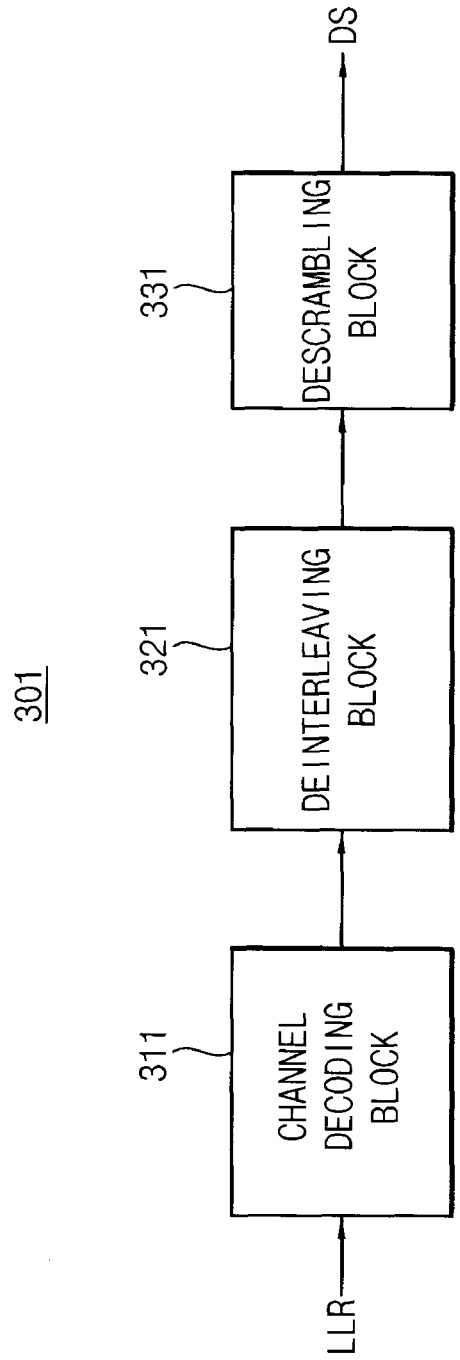
FIG. 3 is a diagram illustrating an example of a decoding unit in the demodulator of FIG. 1.

FIG. 3 is a diagram illustrating an example of a decoding unit in the demodulator of FIG. 1.

Referring to FIG. 3, a decoding unit 301 may include a channel decoding block 311, a deinterleaving block 321 and a descrambling block 331.

The channel decoding block 311 may receive the LLR from the demapping unit 200 of FIG. 1 to perform a channel decoding based on the LLRs sequentially received. For example, the channel decoding block 311 may decode the LLRs using a Bose and Ray-Chaudhuri (BRC) code, a Hadmard code, a Hamming code, Luby transform (LT) code, a Goppa code, a Reed-Solomon error correction code, a Reed-Muller code, a punctured convolution code, a convolution code, a low density parity check (LDPC) code, a turbo code, etc.

The deinterleaving block 321 may deinterleave the decoded bits output from the channel decoding block 311. The deinterleaving block 321 may rearrange the decoded bits according to the interleaving scheme of the transmitter, and may output the deinterleaved bits. Errors caused through the communication channel may be corrected by performing the interleaving in the transmitter and the corresponding deinterleaving in the receiver. For example, a symbol interleaving, a tone interleaving, a cyclic shifting, etc. may be performed in the transmitter. The deinterleaving block 321 in the receiver may perform the corresponding deinterleaving.

The descrambling block 331 may receive the deinterleaved bits from the deinterleaving block 321 and may perform descrambling on the received bits to generate the data bit stream DS. For example, the descrambling block 331 may include a linear feedback shift register (LFSR) to generate a pseudo random binary sequence (PRBS). The descrambling block 331 may provide the data bit stream DS to an upper layer coupled to the decoding unit 301. For example, the data bit stream DS may be provided to a media access controller (MAC). The decoding unit 301 may further include a source coding block configured to compress or convert source data such as media data (not shown).

Figure 4:
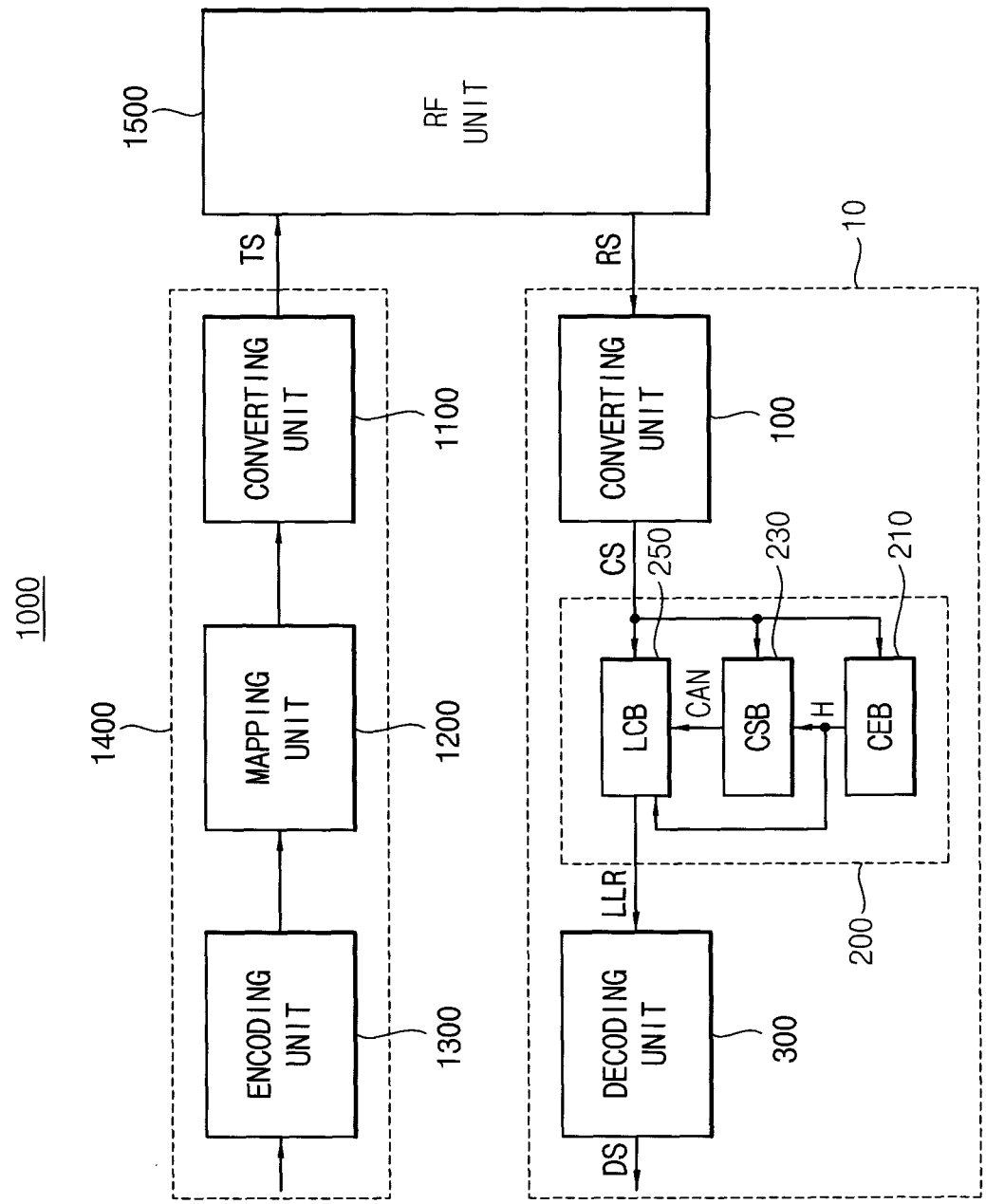
FIG. 4 is a block diagram illustrating a communication device including a demodulator according to example embodiments.

FIG. 4 is a block diagram illustrating a communication device including a demodulator according to example embodiments.

Referring to FIG. 4, a communication device 1000 may include a modulator 1400, an RF unit 1500, and a demodulator 10. The communication device 1000 may be adopted in various systems, i.e., a broadcasting system based on a digital video broad casting-second generation terrestrial (DVB-T2). The modulator 1400 may be included in a transmitter of the system. The demodulator 10 may be included in a receiver of the system.

The modulator 1400 may provide a transmission modulation signal TS to the RF unit 1500, and the demodulator 10 may receive the modulation signal RS transferred through a communication channel included in the RF unit 1500. As mentioned above, the communication channel may be the fading channel and the received modulation signal RS may be distorted compared with the transmission modulation signal TS.

The modulator 1400 may include an encoding unit 1300, a mapping unit 1200, and a first converter 1100. The demodulator 10 may include a second converting unit 100, a demapping unit 200, and a decoding unit 300. The first converting unit 1100 in the modulator 1400 may include a digital-to-analog converter (DAC). The second converting unit 100 in the demodulator 10 may include an analog-to-digital converter (ADC). The RF unit 1500 may include an antenna, a local oscillator, a transmission mixer, a reception mixer, a power amplifier, a low-noise amplifier, a filter, etc. The RF unit 1500 may also include a communication channel for transmitting, transferring and receiving the wireless signals TS and RS.

The encoding unit 1300 may generate a data bit stream by encoding data to be transmitted. The mapping unit may map the encoded data bit stream to generate a sequence of data symbols. The first converting unit 1100 may convert the mapped data symbols from frequency domain to time domain and output the transmission modulation signal TS.

The second converting unit 100 may generate the reception points CS by converting the received modulation signal RS from the time domain to the frequency domain. The demapping unit 210 may demap the reception point by calculating LLRs based on the candidate points CS. The decoding unit 300 may generate the data bit stream DS. The demapping unit 200 may include a channel estimating block (CEB) 210, a candidate selecting block (CSB) 230, and an LLR calculating block (LCB) 250. The channel estimation block 210 may determine a channel response H of a communication channel through which the QAM signal is received. The candidate selecting block 230 may select candidate points CAN corresponding to a portion of the reference points based on distances between the reception point CS and the respective reference points. The LLR calculating block 250 demaps the reception point CN by calculating LLRs based on the candidate points. The demodulator 10 of FIG. 4 is substantially the same as the demodulator 10 of FIG. of FIG. 1. Thus, further descriptions are omitted.

Figure 5:
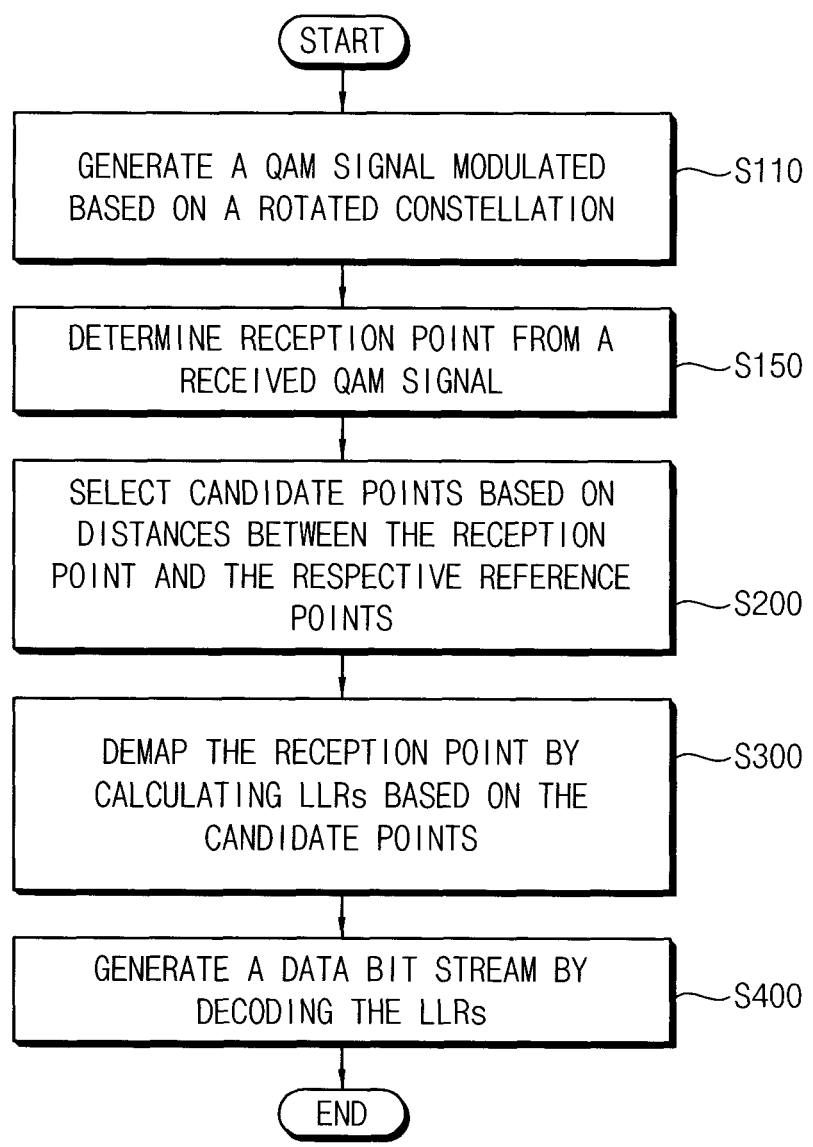
FIG. 5 is a flowchart illustrating a method of data communication according to example embodiments.

FIG. 5 is a flowchart illustrating a method of data communication according to example embodiments.

Referring FIGS. 1, 4 and 5, the modulator 1400 in the communication device 1000 generate the transmission QAM signal TS (S110). TS is modulated based on a rotated constellation, and the demodulator 10 demodulates the received QAM signal (S150, S200, S300 and S400).

The converting unit 100 in the demodulator 10 determines a reception point CS corresponding to a symbol in the received QAM signal (S150) where the symbol is mapped in the modulator 1400 to one of reference points in the rotated constellation. Each reference point may be represented by an in-phase (I) coordinate and a quadrature-phase (Q) coordinate. The candidate selecting block 230 selects candidate points CAN (S200) corresponding to a portion of the reference points based on distances between the reception point CS and the respective reference points. The LLR calculating unit 250 demaps the reception point CS by LLRs based on the candidate points (S300). Each LLR corresponds to each bit of data represented by the reception point CS. The decoding unit 300 generates a data bit stream DS by performing a decoding operation based on the LLRs, for example, using an LDPC code.

As will be described with reference to FIGS. 9, 10, 11, 12, 13 and 14, a first candidate point may be selected among the reference points having a first bit value with respect to each bit of the data, and a second candidate point may be selected among the reference points having a second bit value with respect to each bit of the data. As illustrated in FIG. 4, the processes (S150, S200, S300 and S400) may be performed by the communication device 1000.

As described above, according to example embodiments, the received QAM signal RS may be decoded by selecting a relatively small number of the candidate points to calculate the LLRs. Accordingly, efficient demodulation may be performed by reducing the amount of calculation to obtain the LLRs.

Figure 6:
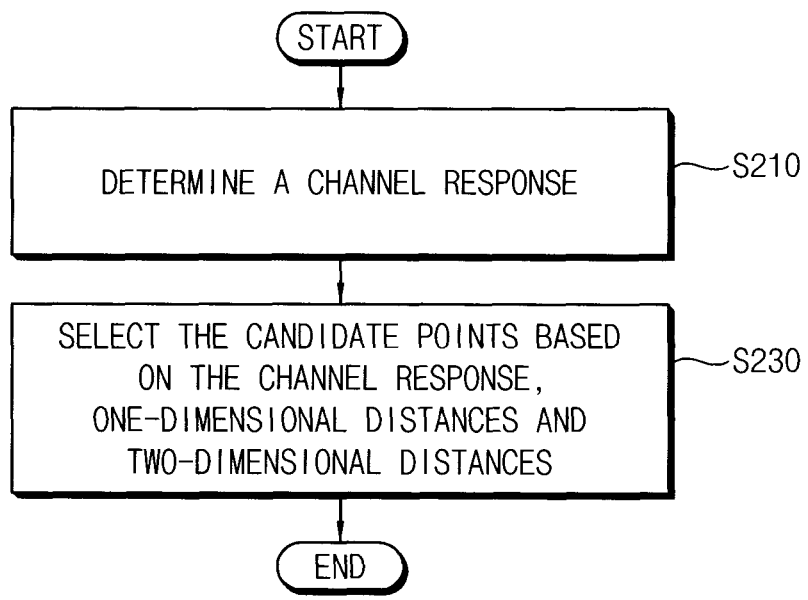
FIG. 6 is a flowchart illustrating a method of selecting candidate points to be used in calculating log-likelihood ratios according to example embodiments.

FIG. 6 is a flowchart illustrating a method of selecting candidate points to be used in calculating log-likelihood ratios according to example embodiments.

Referring FIGS. 1 and 6, the channel estimation block 210 may determine a channel response H (S210) of a communication channel through which the QAM signal is received. When the I-component and the Q-component of the QAM signal are received through different channels, the channel estimation block 210 may determine an I-channel response HI and a Q-channel response HQ, respectively. The candidate selecting block 230 may select the candidate points CS based on the channel response HI and HQ, one-dimensional distances, and two-dimensional distances between the reception point CS and the respective reference points (S230). As described above, the one-dimensional distance may be calculated by comparing one of the I-coordinates and the Q-coordinates between the reception point CS and each reference point. The two-dimensional distance may be calculated by comparing both of the I-coordinates and the Q-coordinates between the reception point CS and each reference point.

Figure 7A:
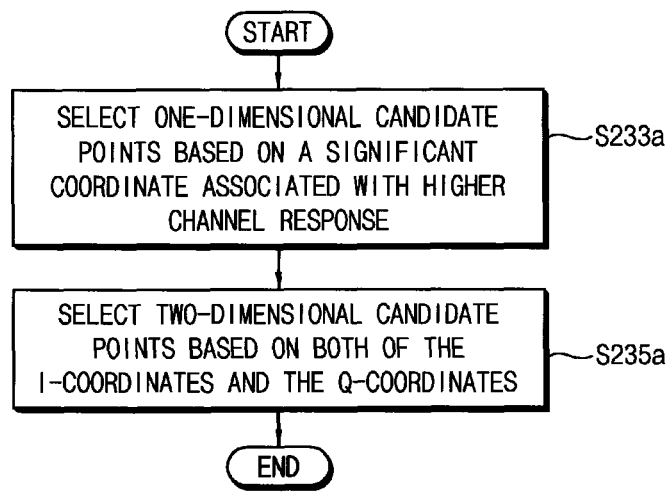
FIGS. 7a, 7b and 7c are flowcharts illustrating a method of selecting candidate points based on a channel response, one-dimensional distances and two-dimensional distances according to example embodiments.
Figure 7B:
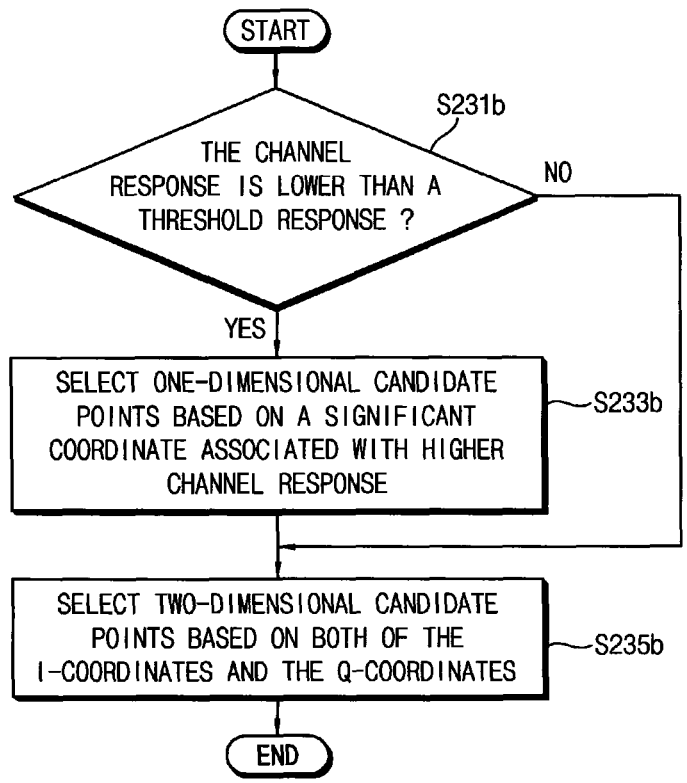
Figure 7C:
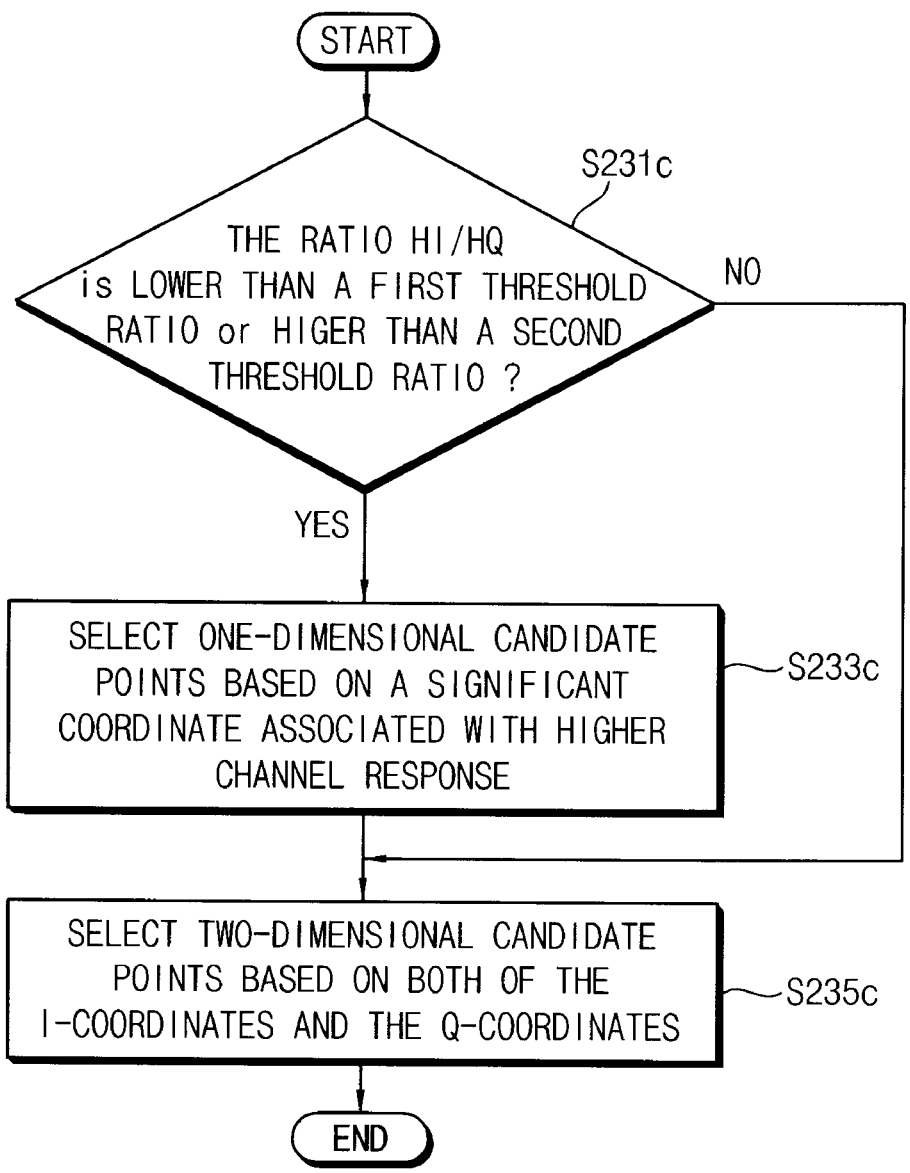

FIGS. 7a, 7b and 7c are flowcharts illustrating a method of selecting candidate points based on a channel response, one-dimensional distances and two-dimensional distances according to example embodiments.

Referring to FIGS. 2 and 7a, the candidate selecting block 230a may select one-dimensional candidate points CANT based on the one-dimensional distances (S233a) and select two-dimensional candidate points CAN2 based on the two-dimensional distances (S235a). The one-dimensional distance may be calculated based on one coordinate, i.e., a significant coordinate among the I-coordinate and the Q-coordinate, and the significant coordinate may be associated with the higher channel response among an I-channel response HI and a Q-channel response Q. For example, when the comparison signal CON from the channel response comparison block 231 indicates that the I-channel response HI is higher than the Q-channel response HQ, the one-dimensional candidate selecting block 235 may calculate the one-dimensional distances along the I-axis by comparing the I-coordinates of the reception point CS and the respective reference points. In other words, the one-dimensional candidate selecting block 235 may select one or more reference points, as the one-dimensional candidate point CANT, which has the smaller difference of the I-coordinate with respect to the reception point CS. In contrast, when the comparison signal CON indicates that the Q-channel response HQ is higher than the I-channel response HI, the one-dimensional candidate selecting block 235 may calculate the one-dimensional distances along the Q-axis by comparing the Q-coordinates of the reception point CS and the respective reference points.

The two-dimensional candidate selecting block 237 may select the two-dimensional candidate points based on the two-dimensional distances between the reception point CS and the respective reference points. In other words, the two-dimensional candidate selecting block 237 may compare both of the I-coordinate and the Q-coordinate to find the reference point having the smaller Euclidean distance to the reception point CS.

In some example embodiments, the two-dimensional distance may be calculated through one-dimensional calculation instead of two-dimensional calculation. For example, as illustrated in FIG. 14, the reception point CS and the reference points may be reversely rotated by a rotation angle of the rotated constellation. Since the reference points are rearranged in parallel to the I-axis and the Q-axis, the I-coordinates of the reversely-rotated reception point and each reversely-rotated reference point may be compared. The Q-coordinates of the reversely-rotated reception point and each reversely-rotated reference point may be compared. Thus, in example embodiments, the two-dimensional distances may be calculated without using the Euclidean distance.

Referring to FIGS. 2 and 7b, the channel response comparison block 231 may determine whether the channel response H is lower than a threshold response (S231b). When at least one of the I-channel response HI and the Q-channel response HQ is lower than a threshold response (i.e., S231b is "YES"), the one-dimensional candidate selecting block 235 may select one-dimensional candidate points CAN1 based on the significant coordinate among the I-coordinate and the Q-coordinate. As described with reference to FIG. 7a, the I-coordinate and the Q-coordinate is associated with the higher channel response among the I-channel response HI and the Q-channel response Q. When the channel response HI and HQ is not lower than a threshold response (i.e., S231b is "NO"), the one-dimensional candidate selecting block 235 may be disabled. Thus, only the two dimensional candidate point CAN2 may be selected by the two-dimensional candidate selecting block 237.

Referring to FIGS. 2 and 7c, the channel response comparison block 231 may determine whether a ratio of an I-channel response and a Q-channel response is lower than a first threshold ratio or higher than a second threshold ratio. The second threshold ratio is higher than the first threshold ratio (S231c). For example, the ratio may be a ratio HI/HQ of the I-channel response HI with respect to the Q-channel response HQ. When the ratio is lower than the first threshold ratio or higher than the second threshold ratio (i.e., S231c is "YES"), which indicates that one channel has severe noises with respect to the other channel, the one-dimensional candidate selecting block 235 may select one-dimensional candidate points CAN1 based on the significant coordinate among the I-coordinate and the Q-coginate. As described with reference to FIG. 7a, the I-coordinate and the Q-coordinate is associated with the higher channel response among the I-channel response HI and the Q-channel response Q. When the ratio is between the first threshold ratio and the second threshold ratio (i.e., S231c is "NO"), the one-dimensional candidate selecting block 235 may be disabled. Thus, only the two dimensional candidate point CAN2 may be selected by the two-dimensional candidate selecting block 237.

Figure 8:
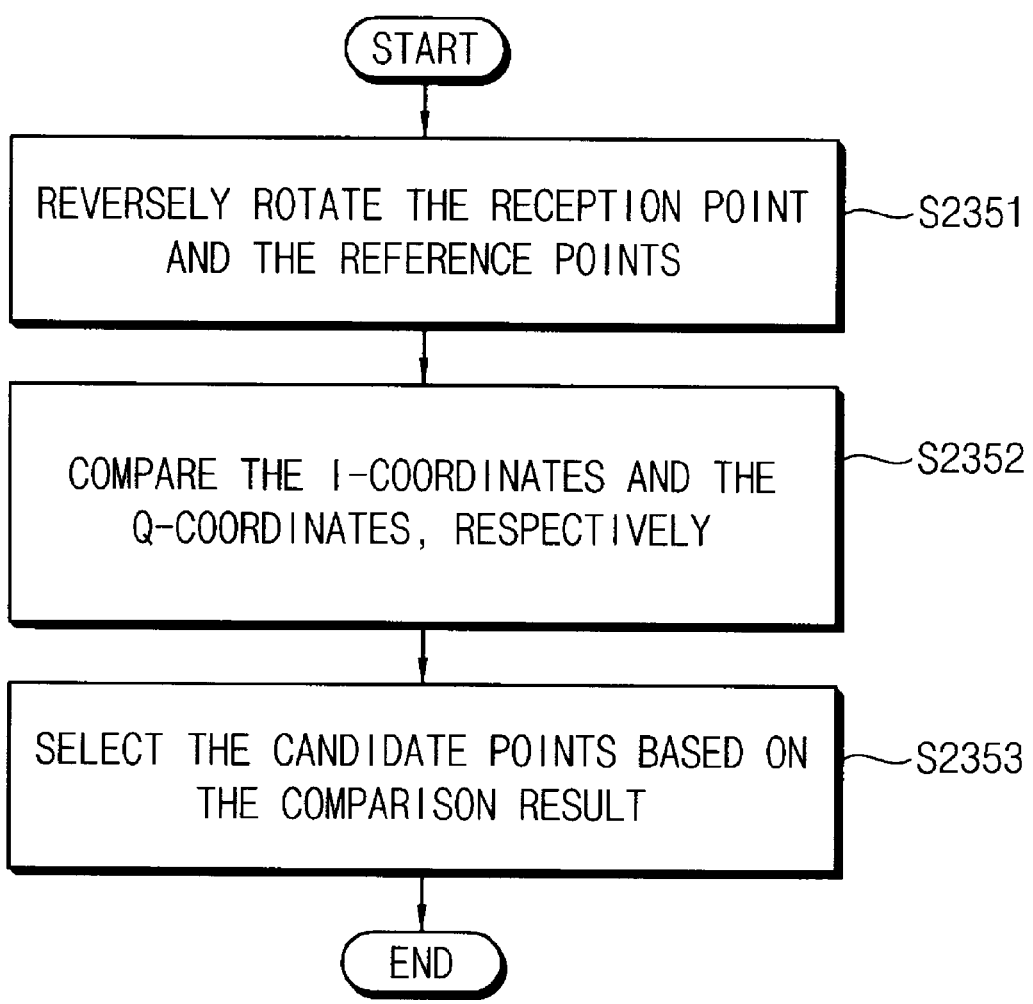
FIG. 8 is a flow chart illustrating a method of selecting two-dimensional candidate points according to example embodiments.

FIG. 8 is a flow chart illustrating a method of selecting two-dimensional candidate points according to example embodiments.

Referring to FIGS. 2 and 8, the tow-dimensional candidate selecting block 237 may rotate the reception point CS, and reversely rotate the reference points by a rotation angle of the rotated constellation (S2351). As illustrated in FIG. 14, since the reference points are rearranged in parallel to the I-axis and the Q-axis, the tow-dimensional candidate selecting block 237 may compare the I-coordinates and the Q-coordinates (S2352) independently of the reversely-rotated reception point and each reversely-rotated reference point. Thus, the two-dimensional candidate selecting block would not calculate the Euclidean distance. The tow-dimensional candidate selecting block 237 may select the two-dimensional candidate points based on the comparison results (S2353). In other words, the two-dimensional distance may be calculated through one-dimensional calculation. Thus, the calculation amount for obtaining the LLRs is reduced.

FIG. 9 is a diagram illustrating a plurality of reference points in a rotated constellation. FIG. 9 illustrates an example of 16-QAM in which each symbol is mapped to one reference point among 16 reference points representing 4-bit data.

As illustrated in FIG. 9, the rotated reference points may be arranged in a matrix. The I-component of the symbol may be represented by the I-coordinate with respect to the I-axis and the Q-component of the symbol may be represented by the Q-coordinate with respect to the Q-axis. The reference points may represent 4-bit data according to the combinations of the I-coordinate and the Q-coordinate. For example, as illustrated in FIG. 9, the reference points may represent one of data '0000', '0001', . . . , '1111', respectively.

The reference points may be divided into a high group and a low group according to the logic level of each bit. For example, a first high group GH1 may include the reference points represented by a small dark circle having a first bit of the logic high level (i.e., '1'). A first low group GL1 may include the reference points represented by a small empty circle having a first bit of the logic low level (i.e., '0'). With respect to each bit and referring to Expression 1 for obtaining the LLR, at least one reference point in the low group is required to be the minimum value of the first term and at least one reference point in the high group is required to be the minimum value of the second term. It will be understood that the reference point of each group nearest to the reception point CS gives the minimum value of each term in Expression 1.

In the rotated constellation, the distorted or damaged component among the I-component and the Q-component may be restored based on the valid one-component. However, the one-dimensional demapping may degrade the reliability of the calculated LLRs since the I-component and the Q-component represented by each coordinate is related to each other in the rotated constellation. Thus, considering all of the reference points, a two-dimensional calculation is required in the related art. In contrast, in example embodiments, the candidate points of the minimum values of the terms in Expression 1 are selected among the reference points in the rotated constellation. Thus, the calculation amount is reduced significantly.

Figure 10:
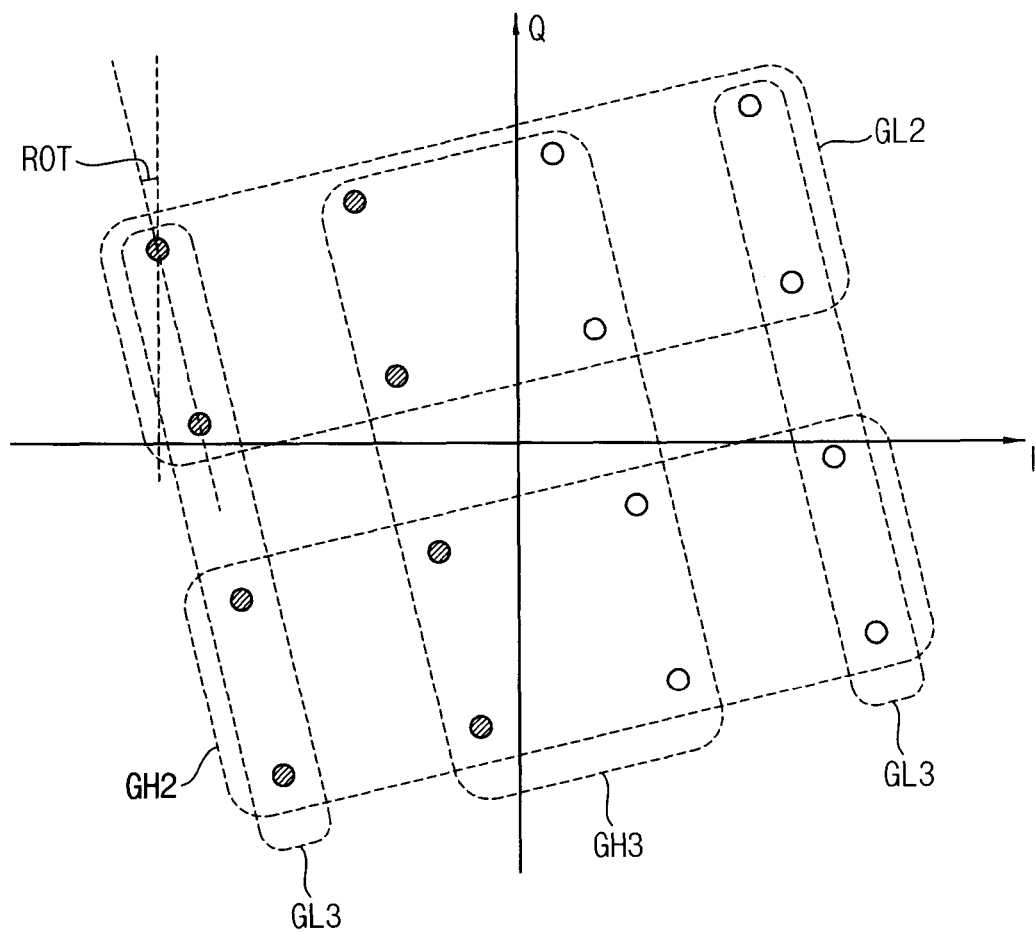
FIG. 10 is a diagram illustrating groups of reference points with respect to each bit of data.

FIG. 10 is a diagram illustrating groups of reference points with respect to each bit of data.

As described with respect to FIG. 9, the reference points may be divided into a second high group GH2 and a second low group GL2 according to the logic level of the second bit, or may be divided into a third high group GH3 and a third low group GL3 according to the logic level of the third bit. For convenience, in FIG. 10, the fourth high group GH4 and the fourth low group GL4 are omitted.

Figure 11:
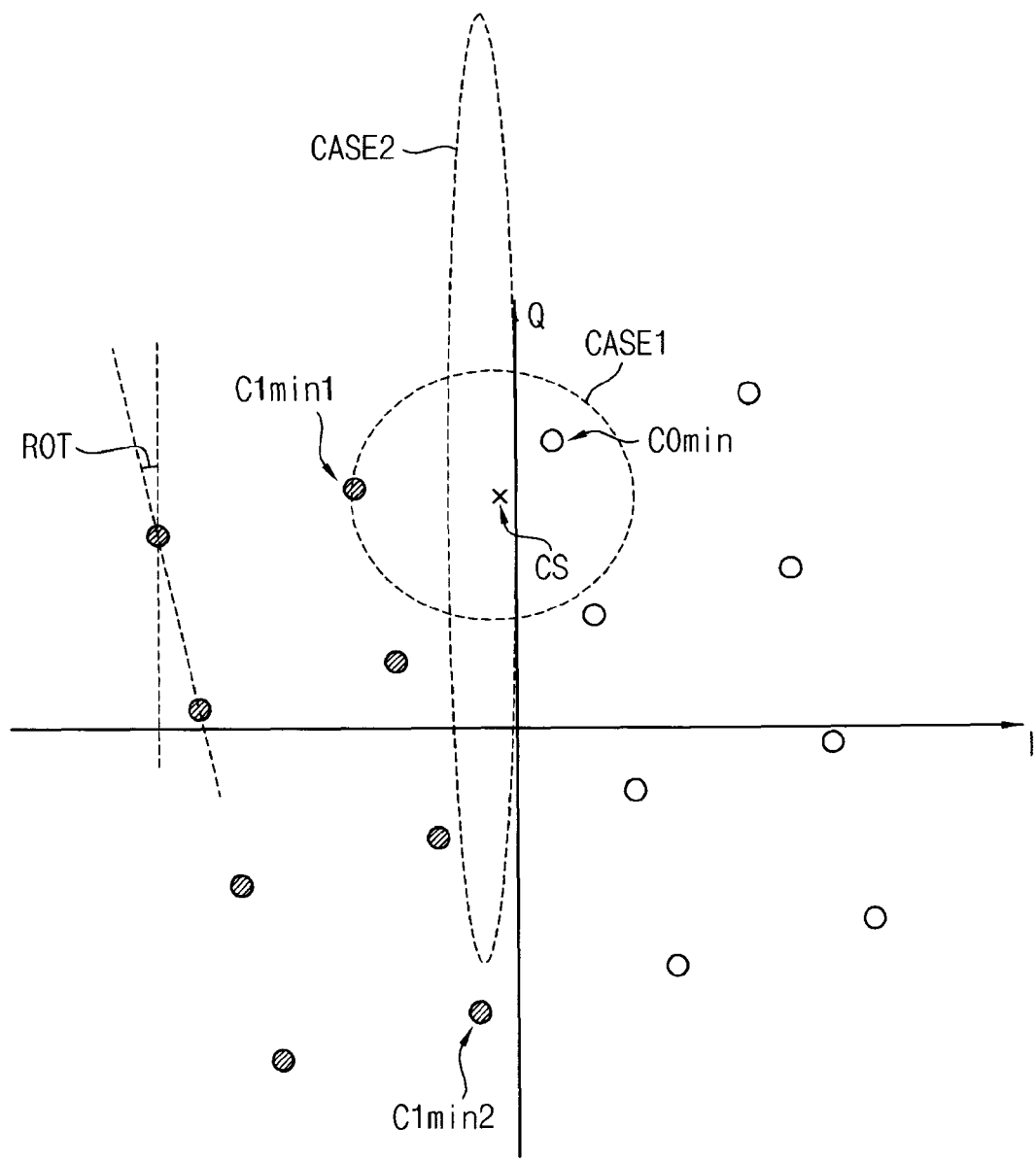
FIG. 11 is a diagram for describing selection of candidate points depending on a channel response.

FIG. 11 is a diagram for describing selection of candidate points depending on a channel response.

CASE 1 indicates an equidistance line from the reception point CS when the I-channel response HI is substantially the same as the Q-channel response HQ. CASE2 indicates an equidistance line from the reception point CS when the I-channel response HI is sufficiently higher than Q-channel response HQ.

As illustrated in FIG. 1, the first candidate point C1$min$1 in the first high group GH1 and the second candidate point C0$min$ may give an appropriate LLR in CASE1. As described above, the first candidates point C1$min$1 and C0$min$ may be selected based on the two-dimensional distances, i.e., the Euclidean distances between the reception point and the respective reference points. However, in CASE2, the third candidate C1$min$2, instead of the first candidate point C1$min$1, may give an appropriate LLR. The appropriate LLR is given since the I-channel response HI is sufficiently higher than Q-channel response HQ. As described above, the third candidate C1$min$2 may be selected based on the one-dimensional distance along the I-axis. In other words, the third candidate C1$min$2 having the nearest one-dimensional distance to the reception point CS along the I-axis has to be included in the candidate points to prevent the errors when the Q-component of the symbol is severely damaged through the fading channel. Thus, the Q-coordinate of the reception point is unreliable. As described above, the one-dimensional and/or the two dimensional candidate points may be efficiently selected depending on the channel response, thereby reducing the calculation amount for the LLR.

As a result, the four candidate points may be selected based on the channel response, the one-dimensional distances, and the two-dimensional distances.

Figure 12:
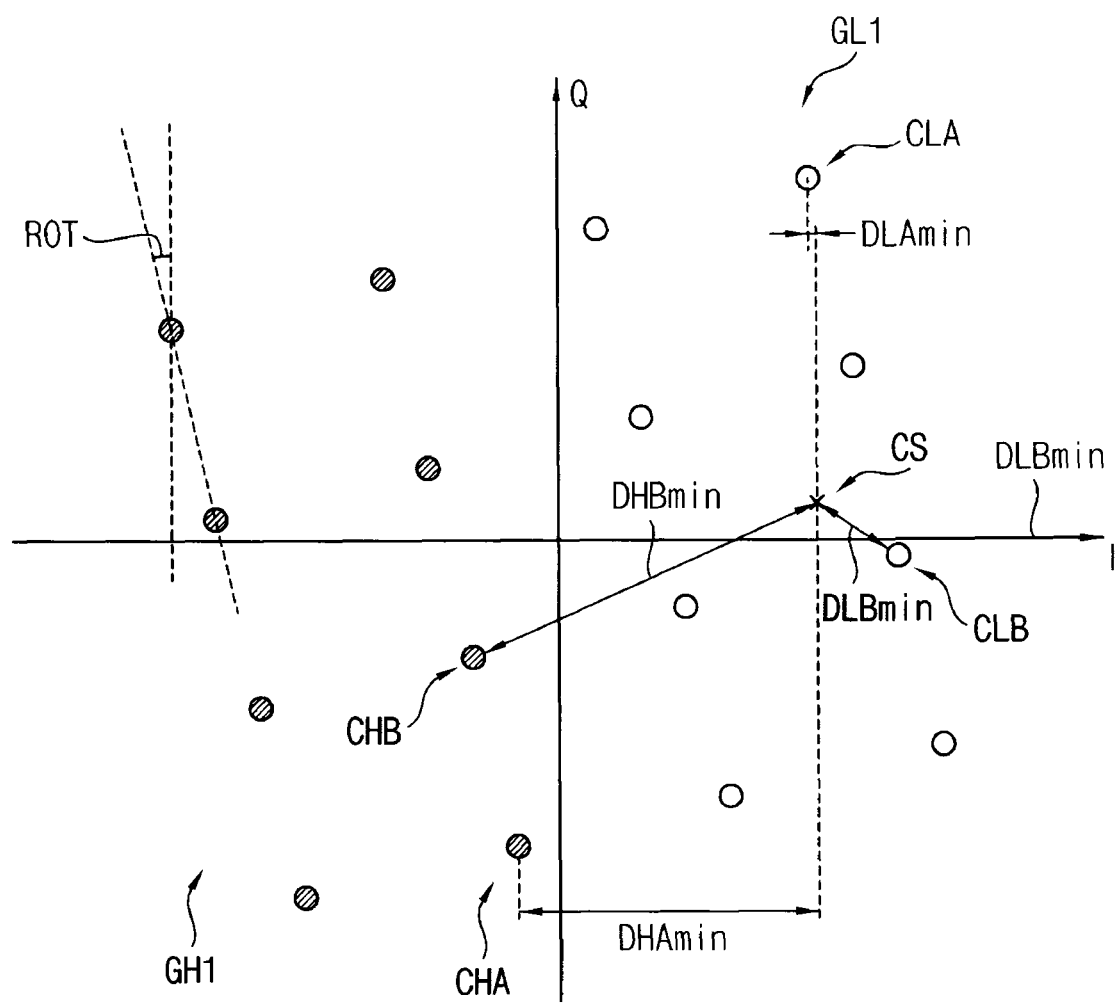
FIGS. 12 and 13 are diagrams illustrating examples of selected candidate points.
Figure 13:
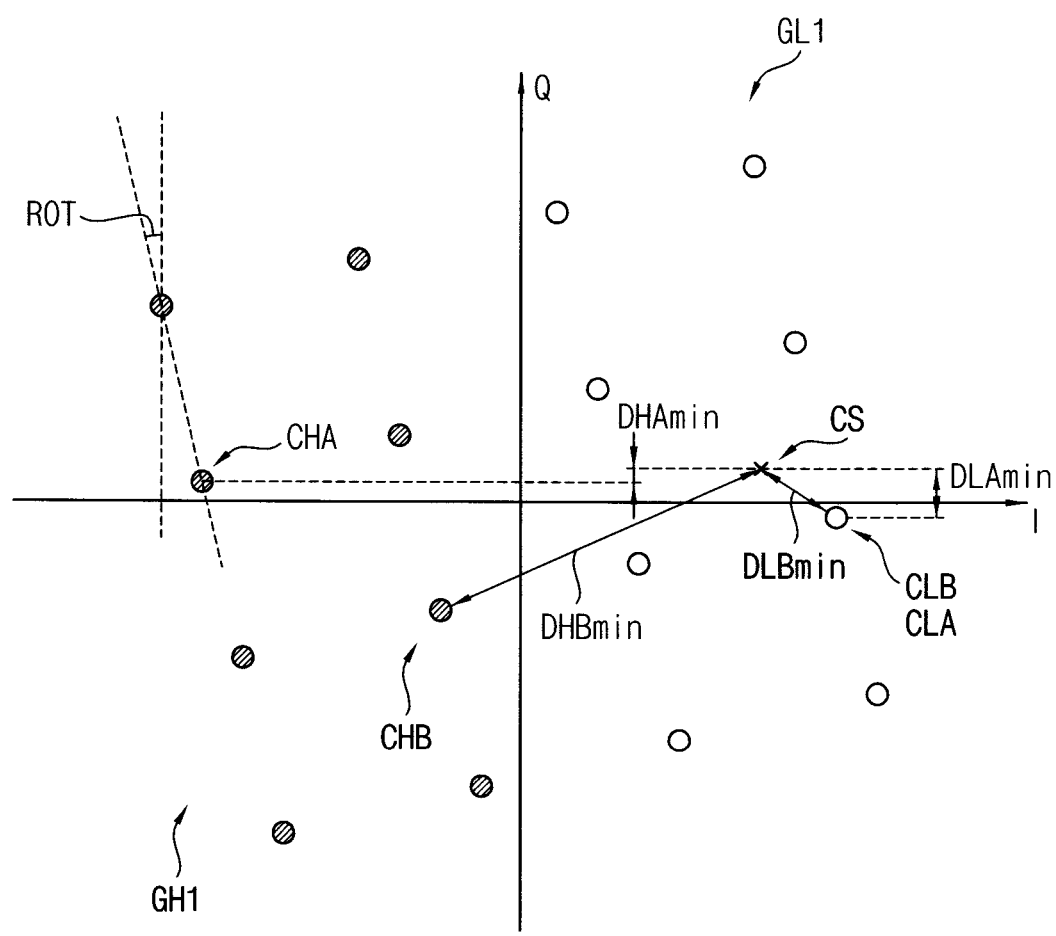

FIGS. 12 and 13 are diagrams illustrating examples of selected candidate points.

FIG. 12 illustrates the selected candidate points when the Q-coordinate corresponds to the significant coordinate, i.e., when the Q-channel response HQ is higher than the I-channel response HI. FIG. 13 illustrates the selected candidate points when the Q-coordinate corresponds to the significant coordinate, i.e., when the Q-channel response HQ is higher than the I-channel response HI.

Referring to FIGS. 2 and 12, the candidate selecting block 230$a$ may select one-dimensional candidate points CLA and CHA based on the one-dimensional distances and select two-dimensional candidate points CLB and CHB based on the two-dimensional distances.

When the comparison signal CON from the channel response comparison block 231 indicates that the Q-coordinate is the significant coordinate, i.e., the Q-channel response HQ is higher than the I-channel response HI or the Q-channel response is higher than the threshold response, the one-dimensional candidate selecting circuit 235 may compare the one dimensional distances along the Q-axis, i.e., the Q-coordinates of the reception point CS and the respective reference points. The one-dimensional candidate selecting circuit 235 may select the one-dimensional candidate point CLA having the smallest distance DLAmin in the first low group GL1 and the one-dimensional candidate point CHA having the smallest distance DHAmin in the first high group GH1.

The two-dimensional candidate selecting circuit 237 may compare the two-dimensional distances between the reception point CS and the respective reference points. The two-dimensional distances are calculated based on both the I-coordinate and the Q-coordinate. The two-dimensional candidate selecting circuit 237 may select the two-dimensional candidate point CLB having the smallest Euclidean distance DLBmin in the first low group GL1 and the two-dimensional candidate point CHB having the smallest Euclidean distance DHBmin in the first high group GH1.

Referring to FIGS. 2 and 13, the candidate selecting block 230a may select one-dimensional candidate points CLA and CHA based on the one-dimensional distances and select two-dimensional candidate points CLB and CHB based on the two-dimensional distances.

When the comparison signal CON from the channel response comparison block 231 indicates that the I-coordinate is the significant coordinate, i.e., the I-channel response HI is higher than the Q-channel response HQ or the I-channel response is higher than the threshold response, the one-dimensional candidate selecting circuit 235 may compare the one dimensional distances along the I-axis, i.e., the I-coordinates of the reception point CS and the respective reference points. The one-dimensional candidate selecting circuit 235 may select the one-dimensional candidate point CLA having the smallest distance DLAmin in the first low group GL1 and the one-dimensional candidate point CHA having the smallest distance DHAmin in the first high group GH1.

The selection of the two-dimensional candidate selecting circuit 237 is the same as the case of FIG. 12. Repeated descriptions are omitted. Compared with the case of FIG. 12, three candidate points may be selected since the one-dimensional candidate point CLA and the two-dimensional candidate point CLB are the same.

As described above, the two-dimensional candidate selecting circuit 237 may select the two-dimensional candidate points using the one-dimensional calculation instead of the two-dimensional calculation. This will be further described with reference to FIG. 14.

FIG. 14 is a diagram for describing the method of selecting two-dimensional candidate points of FIG. 8.

As illustrated in FIG. 14, the reception point Cs and the reference points may be reversely rotated by the rotation angle ROT so that the previous I-axis and Q-axis may coincide with the new I'-axis and Q'-axis.

Since the reference points are rearranged in parallel to the I'-axis and the Q'-axis, the one-dimensional distances may be considered to find the reference point having the smallest Euclidean distance to the reception point CS'. In other words, the two-dimensional candidate selecting circuit 237 may compare the I'-coordinates of the reversely-rotated reception point CS' and each reversely-rotated reference point and compare the Q'-coordinates of the reversely-rotated reception point CS' and each reversely-rotated reference point.

As illustrated in FIG. 14, the reference point CLB' in the first may be selected as the two-dimensional candidate point. The two-dimensional candidate point is simultaneously included in the subgroup SGLI of the four points having the smallest one-dimensional distance along the I'-axis and the subgroup SGLQ of the two points having the smallest one-dimensional distance along the Q'-axis. In the same way, the reference point CHB' in the first may be selected as the two-dimensional candidate point. The two-dimensional candidate point is simultaneously included in the subgroup SGHI of the four points having the smallest one-dimensional distance along the I'-axis and the subgroup SGHQ of the two points having the smallest one-dimensional distance along the Q'-axis.

The two-dimensional candidate points CLB' and CHB' may be selected efficiently by reversely rotating the points and comparing the I'-coordinates and the Q'-coordinates, independently. Thus, the calculation amount for the Euclidean distances between the points is reduced.

Figure 15:
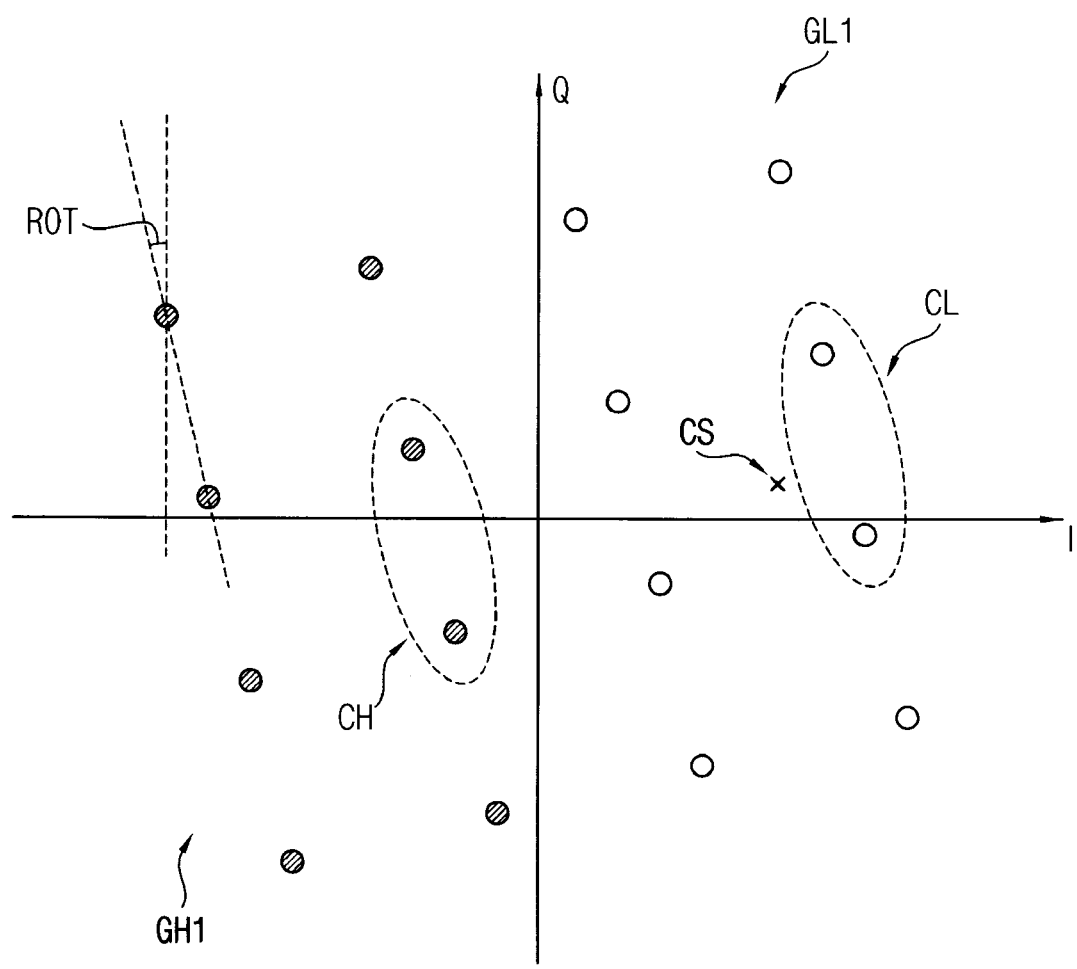
FIGS. 15 and 16 are diagrams illustrating other examples of selected candidate points.
Figure 16:
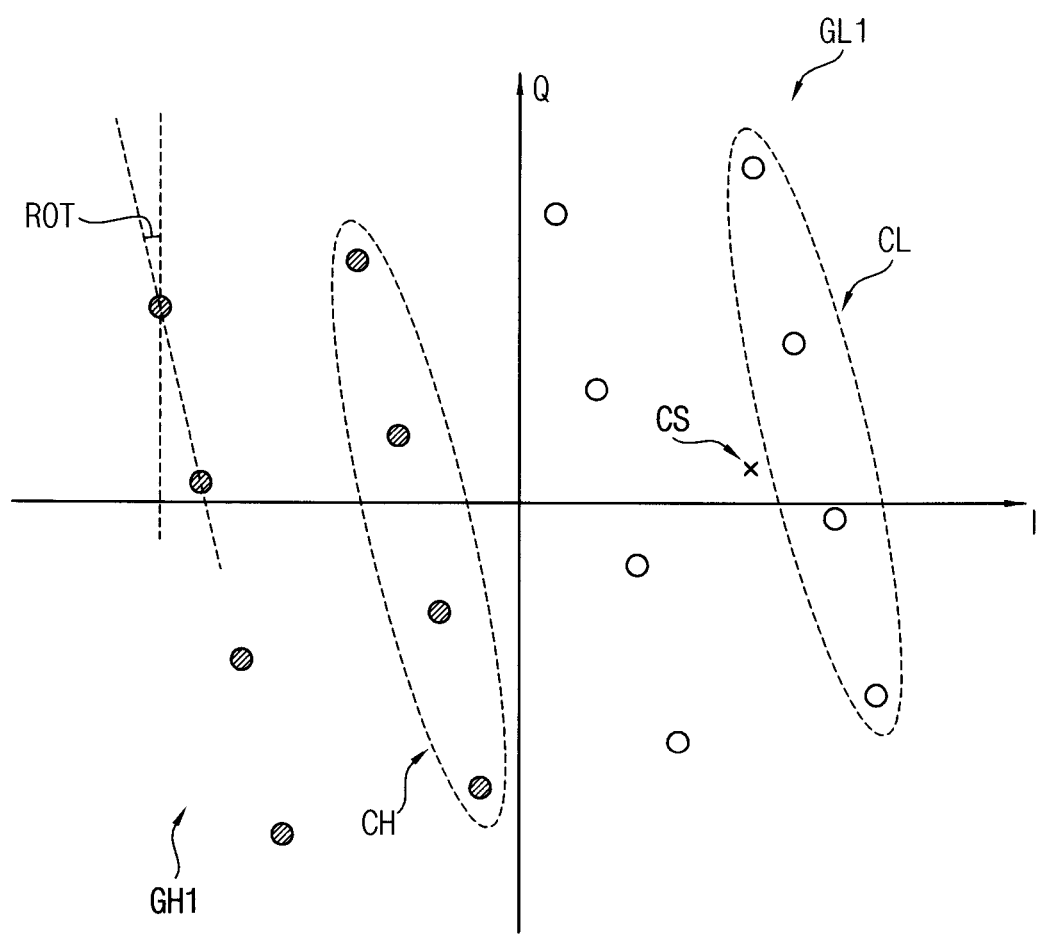

FIGS. 15 and 16 are diagrams illustrating other examples of selected candidate points.

As illustrated in FIGS. 15 and 16, more candidate points may be selected to obtain further reliable LLR. Compared with the embodiments of FIGS. 12, 13 and 14, where only the reference point of the smallest one-dimensional distance is selected as the one-dimensional candidate point with respect to each group, FIG. 15 illustrates an embodiment where two reference points CL having the nearest one-dimensional distance to the reception point CS are be selected in the first low group GL1 and two reference points CH having the nearest one-dimensional distance to the reception point CS are selected in the first high group GH1. Also the three reference points CL in the first low group GL1 and the three reference points CL in the first high group GH1 may be selected as the one-dimensional candidate points as illustrated in FIG. 16.

Even though example embodiments are described with reference to the 16-QAM and the particular number of candidate points, it will be easily understood that example embodiments may be adapted to arbitrary QAMs using a rotated constellation.

Figure 17:
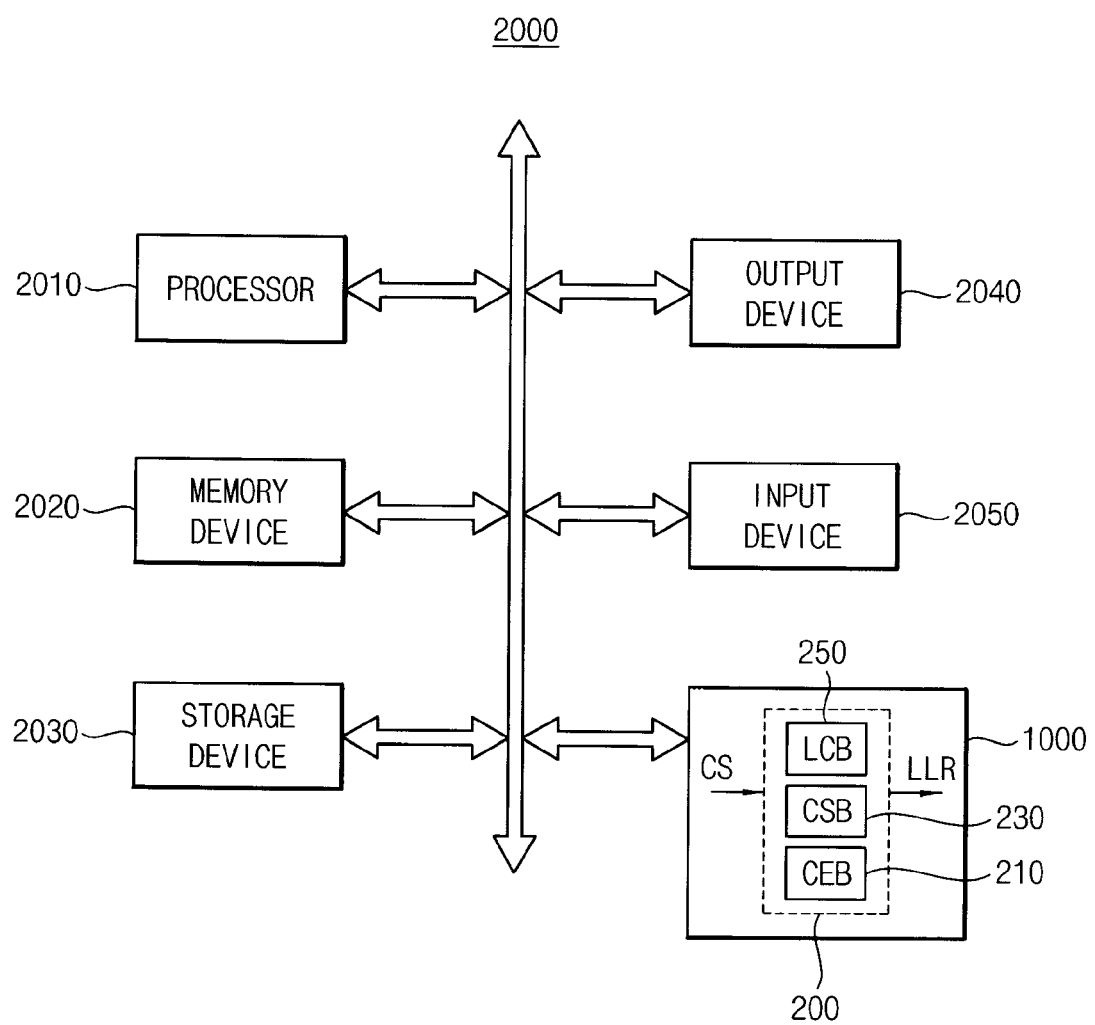
FIG. 17 is a block diagram illustrating a system including a demodulator according to example embodiments.

FIG. 17 is a block diagram illustrating a system including a demodulator according to example embodiments.

Referring to FIG. 17, a system 2000 may include a processor 2010, a memory device 2020, and a communication device 1000. According to the kind of system 2000, the system 2000 may further include a storage device 2030, an output device 2040, an input device 2050, etc.

The processor 2010 may perform various operation such as calculation and execution of commands. For example, the processor 2010 may be a microprocessor or a central processing unit (CPU). The processor 2010 may be coupled to the memory device 2020 via an address bus, a control bus, and/or a data bus. The memory device 2020 may be a volatile memory, i.e., dynamic random access memory (DRAM), a static random access memory (SRAM), or a non-volatile memory, i.e., an erasable programmable read-only memory (EPROM), an electrically erasable programmable read-only memory (EEPROM), a resistive random access memory (RRAM), a flash memory, etc.

The processor 2010 may be coupled to an extended bus, i.e., a peripheral component interconnect (PCI) to control the input device 2040, i.e., a mouse, a keyboard, the output device 2040, i.e., a display, a printer, and/or the storage device 2030, i.e., a solid state drive (SSD), a hard disk drive (HDD), etc.

The communication device 1000 may include the demapping unit 200 according to example embodiments. The demapping unit 200 may include a channel estimating block 210, a candidate selecting block 230, and an LLR calculating block 250. The operation of the communication device 1000 is substantially the same as example embodiments. Thus, repeated descriptions are omitted.

At least a portion of the processes or the operations according to example embodiments may be implemented in hardware, software or a combination. When the portion is implemented in software, a general purpose processor (GPP) or Special Purpose Processor (SPP) may be used to execute the programs.

According to example embodiments, the candidate points corresponding to a portion of the reference points are used to calculate the LLR. Thus, the calculation amount may be reduced.

The example embodiment may be adapted to various devices and systems, such as a communication device based on DVB-T2 using a rotated constellation.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. Therefore, it is to be understood that the foregoing is illustrative of various example embodiments, and is not to be construed as limited to the specific example embodiments disclosed. Modifications to the disclosed example embodiments, as well as other example embodiments, are intended to be included within the scope of the appended claims.

What is claimed is:

1. A method of demodulating a quadrature amplitude modulation (QAM) signal, the method comprising:
    determining a reception point corresponding to a symbol in the QAM signal that is received, the symbol being mapped to one reference point of a plurality of reference points in a rotated constellation, the plurality of reference points being represented by an in-phase (I) coordinate and a quadrature-phase (Q) coordinate;
    selecting a plurality of candidate points corresponding to a portion of the plurality of reference points based on distances between the reception point and the respective reference points; and
    demapping the reception point by calculating a plurality of log-likelihood ratios based on the plurality of candidate points, the plurality of log-likelihood ratios corresponding to bits of data represented by the reception point,
    wherein the selecting the plurality of candidate points comprises:
    determining a channel response of a communication channel through which the QAM signal is received; and
    selecting the plurality of candidate points based on the channel response, a plurality of one-dimensional distances, and a plurality of two-dimensional distances between the reception point and the respective reference points.

2. The method of claim 1, wherein determining the reception point comprises:
    determining an I-coordinate of the reception point based on an I-component of the symbol; and
    determining a Q-coordinate of the reception point based on a Q-component of the symbol.

3. The method of claim 2, wherein selecting the plurality of candidate points comprises:
    selecting a plurality of one-dimensional candidate points based on the plurality of one-dimensional distances, the plurality of one-dimensional distances being calculated based on a significant coordinate among the I-coordinate and the Q-coordinate, the significant coordinate being associated with a higher channel response among an I-channel response and a Q-channel response; and
    selecting a plurality of two-dimensional candidate points based on the plurality of two-dimensional distances, the plurality of two-dimensional distances being calculated based on both the I-coordinate and the Q-coordinate.

4. The method of claim 2, wherein selecting the plurality of candidate points comprises:
    selecting a plurality of one-dimensional candidate points based on the plurality of one-dimensional distances, the plurality of one-dimensional distances being calculated based on a significant coordinate among the I-coordinate and the Q-coordinate, the significant coordinate being associated with a channel response that is higher than a threshold response; and
    selecting a plurality of two-dimensional candidate points based on the plurality of two-dimensional distances, the plurality of two-dimensional distances being calculated based on both the I-coordinate and the Q-coordinate.

5. The method of claim 2, wherein selecting the plurality of candidate points comprises:
    selecting a plurality of one-dimensional candidate points based on the plurality of one-dimensional distances when a ratio of an I-channel response and a Q-channel response is lower than a first threshold ratio or higher than a second threshold ratio, the plurality of one-dimensional distances being calculated based on a significant coordinate among the I-coordinate and the Q-coordinate, the significant coordinate being associated with a higher channel response among an I-channel response and a Q-channel response; and
    selecting a plurality of two-dimensional candidate points based on the plurality of two-dimensional distances, the plurality of two-dimensional distances being calculated based on both the I-coordinate and the Q-coordinate.

6. The method of claim 1, wherein at least one one-dimensional distance is calculated by comparing an I-coordinate of the reception point and at least one reference point or comparing a Q-coordinate of the reception point and at least one reference point, based on the channel response.

7. The method of claim 1, wherein at least one two-dimensional distance is calculated by reversely rotating the reception point and the plurality of reference points by a rotation angle of the rotated constellation and by comparing an I-coordinate of the reversely-rotated reception point and at least one reversely-rotated reference point and comparing a Q-coordinate of the reversely-rotated reception point and at least one reversely-rotated reference point.

8. The method of claim 1, wherein the plurality of candidate points comprises at least two reference points with respect to the bits of the data represented by the reception point.

9. The method of claim 1, wherein selecting the plurality of candidate points comprises:
    selecting a first candidate point among the plurality of reference points having a first bit value with respect to the bits of data; and
    selecting a second candidate point among the plurality of reference points having a second bit value with respect to the bits of data.

10. The method of claim 1, wherein an I-component and a Q-component of the symbol are received through different channels.

11. The method of claim 1, wherein the QAM signal that is received is an orthogonal frequency division multiplexing (OFDM) signal that is received through a wireless communication channel from a transmitter.

12. The method of claim 1, further comprising:
    generating a data bit stream by performing a decoding operation based on the plurality of log-likelihood ratios.

13. The method of claim 12, wherein a low density parity check (LDPC) code is used to generate the data bit steam.

14. The method of claim 1, wherein the plurality of one-dimensional distances are calculated in the rotated constellation, and the plurality of one-dimensional distances are calculated in a constellation that is rotated reversely by a rotation angle of the rotated constellation.

15. A method of data communication, comprising:
generating a quadrature amplitude modulation (QAM) signal using a rotated constellation and transmitting the QAM signal through a communication channel; and
receiving the QAM signal and demodulating the received QAM signal comprising:
determining a reception point corresponding to each symbol in the received QAM signal, each symbol being mapped to one reference point of a plurality of reference points in the rotated constellation, the plurality of reference points being represented by an in-phase (I) coordinate and a quadrature-phase (Q) coordinate;
selecting a plurality of candidate points among the plurality of reference points based on distances between the reception point and the respective reference points; and
demapping the reception point by calculating a plurality of log-likelihood ratios based on the plurality of candidate points, the plurality of log-likelihood ratios corresponding to bits of data represented by the reception point,
wherein the selecting the plurality of candidate points comprises:
determining a channel response of a communication channel through which the QAM signal is received; and
selecting the plurality of candidate points based on the channel response, a plurality of one-dimensional distances, and a plurality of two-dimensional distances between the reception point and the respective reference points.

16. A demodulator comprising:
a converting unit that receives a quadrature amplitude modulation (QAM) signal and determines a reception point corresponding to a symbol in the received QAM signal, the symbol being mapped in a transmitter to one reference point of a plurality of reference points in a rotated constellation, the plurality of reference points being represented by an in-phase (I) coordinate and a quadrature-phase (Q) coordinate; and
a demapping unit that selects a plurality of candidate points corresponding to a portion of the plurality of reference points based on distances between the reception point and the respective reference points and performs demapping on the reception point by calculating a plurality of log-likelihood ratios based on the plurality of candidate points, the plurality of log-likelihood ratios corresponding to bits of data represented by the reception point,
wherein the demapping unit comprises:
a channel estimation block which determines a channel response of a communication channel through which the QAM signal is received;
a candidate selecting block which selects the plurality of candidate points based on the channel response, a plurality of one-dimensional distances, and a plurality of two-dimensional distances between the reception point and the respective reference points; and
a log-likelihood ratio calculating block which demaps the reception point by calculating the plurality of log-likelihood ratios based on the plurality of candidate points.

17. The demodulator of claim 16, further comprising:
a decoding unit that generates a data bit stream by performing a decoding operation based on the plurality of log-likelihood ratios.

18. The demodulator of claim 16, wherein the candidate selecting block comprises:
a channel response comparison block which compares an I-channel response and a Q-channel response and output a comparison signal;
an one-dimensional candidate selecting block which selects a plurality of one-dimensional candidate points based on the comparison signal and the plurality of one-dimensional distances between the reception point and the respective reference points; and
a two-dimensional candidate selecting block which selects a plurality of two-dimensional candidate points based on the comparison signal and the plurality of two-dimensional distances between the reception point and the respective reference points.

19. The demodulator of claim 16, wherein at least one two-dimensional distance is calculated by reversely rotating the reception point and the plurality of reference points by a rotation angle of the rotated constellation and by comparing an I-coordinate of the reversely-rotated reception point and at least one reversely-rotated reference point and comparing a Q-coordinate of the reversely-rotated reception point and at least one reversely-rotated reference point.

* * * * *